(12) United States Patent
Wong et al.

(10) Patent No.: US 10,921,531 B2
(45) Date of Patent: Feb. 16, 2021

(54) LC TYPE CONNECTOR WITH PUSH/PULL ASSEMBLY FOR RELEASING CONNECTOR FROM A RECEPTACLE USING A CABLE BOOT

(71) Applicant: Senko Advanced Components, Inc, Marlborough, MA (US)

(72) Inventors: Kim man Wong, Kowloon (HK); Kazuyoshi Takano, Tokyo (JP)

(73) Assignee: Senko Advanced Components, Inc., Marlborough, MA (US)

( * ) Notice: Subject to any disclaimer, the term of this patent is extended or adjusted under 35 U.S.C. 154(b) by 0 days.

(21) Appl. No.: 16/569,624

(22) Filed: Sep. 12, 2019

(65) Prior Publication Data

US 2020/0081201 A1   Mar. 12, 2020

Related U.S. Application Data

(63) Continuation-in-part of application No. 16/199,139, filed on Nov. 24, 2018, and a continuation-in-part of application No. 16/539,854, filed on Aug. 13, 2019.

(60) Provisional application No. 62/730,373, filed on Sep. 12, 2018.

(51) Int. Cl.
  *G02B 6/38*      (2006.01)
  *H01R 13/627*    (2006.01)
  *H01R 24/64*     (2011.01)

(52) U.S. Cl.
  CPC ......... *G02B 6/3893* (2013.01); *G02B 6/3879* (2013.01); *G02B 6/3887* (2013.01); *G02B 6/3897* (2013.01); *H01R 13/6272* (2013.01); *H01R 24/64* (2013.01)

(58) Field of Classification Search
  CPC ........................... G02B 6/3893; G02B 6/3879
  See application file for complete search history.

(56) References Cited

U.S. PATENT DOCUMENTS

| | | |
|---|---|---|
| 585,194 A | 6/1897 | Favor |
| 678,283 A | 7/1901 | Shaefer |
| 3,721,945 A | 3/1973 | Hults |
| 4,150,790 A | 4/1979 | Potter |
| 4,240,695 A | 12/1980 | Evans |
| 4,327,964 A | 5/1982 | Haesly |
| 4,478,473 A | 10/1984 | Frear |
| 4,762,388 A | 8/1988 | Tanaka |
| 4,764,129 A | 8/1988 | Jones |
| 4,840,451 A | 6/1989 | Sampson |

(Continued)

FOREIGN PATENT DOCUMENTS

| | | |
|---|---|---|
| CN | 2836038 Y | 11/2006 |
| CN | 201383588 Y | 1/2010 |

(Continued)

OTHER PUBLICATIONS

International Search Report and Written Opinion, Application No. PCT/US19/46397, dated Nov. 12, 2019, pp. 6.

(Continued)

*Primary Examiner* — Sung H Pak
(74) *Attorney, Agent, or Firm* — Edward S. Jarmolowicz, Esq.

(57) ABSTRACT

A LC type connector assembly with a push/pull cable boot integrally formed with a protrusion that accepts an adapter release for releasing a fiber optic connector from an adapter port.

11 Claims, 20 Drawing Sheets

(56) References Cited

U.S. PATENT DOCUMENTS

| | | |
|---|---|---|
| 4,872,736 A | 10/1989 | Myers |
| 4,979,792 A | 12/1990 | Weber |
| 5,026,138 A | 6/1991 | Boudreau |
| 5,031,981 A | 7/1991 | Peterson |
| 5,041,025 A | 8/1991 | Haitmanek |
| 5,073,045 A | 12/1991 | Abendschein |
| D323,143 S | 1/1992 | Ohkura |
| 5,101,463 A | 3/1992 | Cubukciyan |
| 5,146,813 A | 9/1992 | Stanfill, Jr. |
| 5,159,652 A | 10/1992 | Grassin D'Alphonse |
| 5,265,181 A | 11/1993 | Chang |
| 5,289,554 A | 2/1994 | Cubukciyan |
| 5,315,679 A | 5/1994 | Baldwin |
| 5,317,663 A | 5/1994 | Beard |
| 5,321,784 A | 6/1994 | Cubukciyan |
| 5,335,301 A | 8/1994 | Newman |
| 5,348,487 A | 9/1994 | Marazzi |
| 5,418,875 A | 5/1995 | Nakano |
| 5,444,806 A | 8/1995 | de Marchi |
| 5,481,634 A | 1/1996 | Anderson |
| 5,506,922 A | 4/1996 | Grois |
| 5,521,997 A | 5/1996 | Rovenolt |
| 5,570,445 A | 10/1996 | Chou |
| 5,588,079 A | 12/1996 | Tanabe |
| 5,602,951 A | 2/1997 | Shiota |
| 5,684,903 A | 11/1997 | Kyomasu |
| 5,687,268 A | 11/1997 | Stephenson |
| 5,781,681 A | 7/1998 | Manning |
| 5,845,036 A | 12/1998 | De Marchi |
| 5,862,282 A | 1/1999 | Matsuura |
| 5,915,987 A | 6/1999 | Reed |
| 5,930,426 A | 7/1999 | Harting |
| 5,937,130 A | 8/1999 | Amberg |
| 5,953,473 A | 9/1999 | Shimotsu |
| 5,956,444 A | 9/1999 | Duda |
| 5,971,626 A | 10/1999 | Knodell |
| 6,041,155 A | 3/2000 | Anderson |
| 6,049,040 A | 4/2000 | Biles |
| 6,095,862 A | 8/2000 | Doye |
| 6,134,370 A | 10/2000 | Childers |
| 6,178,283 B1 | 1/2001 | Weigel |
| RE37,080 E | 3/2001 | Stephenson |
| 6,206,577 B1 | 3/2001 | Hall, III |
| 6,206,581 B1 | 3/2001 | Driscoll |
| 6,227,717 B1 | 5/2001 | Ott |
| 6,238,104 B1 | 5/2001 | Yamakawa |
| 6,240,228 B1 | 5/2001 | Chen |
| 6,247,849 B1 | 6/2001 | Liu |
| 6,250,817 B1 | 6/2001 | Lampert |
| 6,276,840 B1 | 8/2001 | Weiss |
| 6,318,903 B1 | 11/2001 | Andrews |
| 6,364,537 B1 | 4/2002 | Maynard |
| 6,379,052 B1 | 4/2002 | de Jong |
| 6,422,759 B1 | 7/2002 | Kevern |
| 6,450,695 B1 | 9/2002 | Matsumoto |
| 6,461,054 B1 | 10/2002 | Iwase |
| 6,471,412 B1 | 10/2002 | Belenkiy |
| 6,478,472 B1 | 11/2002 | Anderson |
| 6,485,194 B1 | 11/2002 | Shirakawa |
| 6,527,450 B1 | 3/2003 | Miyachi |
| 6,530,696 B1 | 3/2003 | Ueda |
| 6,551,117 B2 | 4/2003 | Poplawski |
| 6,565,262 B2 | 5/2003 | Childers |
| 6,579,014 B2 | 6/2003 | Melton |
| 6,585,194 B1 | 7/2003 | Brushwood |
| 6,634,796 B2 | 10/2003 | de Jong |
| 6,634,801 B1 | 10/2003 | Waldron |
| 6,648,520 B2 | 11/2003 | McDonald |
| 6,668,113 B2 | 12/2003 | Togami |
| 6,682,228 B2 | 1/2004 | Rathnam |
| 6,685,362 B2 | 2/2004 | Burkholder |
| 6,695,486 B1 | 2/2004 | Falkenberg |
| 6,817,272 B2 | 11/2004 | Holland |
| 6,854,894 B1 | 2/2005 | Yunker |
| 6,869,227 B2 | 3/2005 | Del Grosso |
| 6,872,039 B2 | 3/2005 | Baus |
| 6,935,789 B2 | 8/2005 | Gross, III |
| 7,036,993 B2 | 5/2006 | Luther |
| 7,052,186 B1 | 5/2006 | Bates |
| 7,077,576 B2 | 7/2006 | Luther |
| 7,091,421 B2 | 8/2006 | Kukita |
| D533,504 S | 12/2006 | Lee |
| D534,124 S | 12/2006 | Taguchi |
| 7,150,567 B1 | 12/2006 | Luther |
| 7,153,041 B2 | 12/2006 | Mine |
| 7,198,409 B2 | 4/2007 | Smith |
| D543,124 S | 5/2007 | Raatikainen |
| D543,146 S | 5/2007 | Chen |
| 7,258,493 B2 | 8/2007 | Milette |
| 7,264,402 B2 | 9/2007 | Theuerkorn |
| 7,281,859 B2 | 10/2007 | Mudd |
| D558,675 S | 1/2008 | Chien |
| 7,315,682 B1 | 1/2008 | En Lin |
| 7,325,976 B2 | 2/2008 | Gurreri |
| 7,325,980 B2 | 2/2008 | Pepe |
| 7,329,137 B2 | 2/2008 | Martin |
| 7,331,718 B2 | 2/2008 | Yazaki |
| 7,354,291 B2 | 4/2008 | Caveney |
| 7,371,082 B2 | 5/2008 | Zimmel |
| 7,387,447 B2 | 6/2008 | Mudd |
| D572,661 S | 7/2008 | En Lin |
| 7,431,604 B2 | 10/2008 | Waters |
| 7,463,803 B2 | 12/2008 | Cody |
| 7,465,180 B2 | 12/2008 | Kusuda |
| 7,473,124 B1 | 1/2009 | Briant |
| 7,510,335 B1 | 3/2009 | Su |
| 7,513,695 B1 | 4/2009 | Lin |
| 7,534,128 B2 | 5/2009 | Caveney |
| 7,540,666 B2 | 6/2009 | Luther |
| 7,588,373 B1 | 9/2009 | Sato |
| 7,591,595 B2 | 9/2009 | Lu |
| 7,594,766 B1 | 9/2009 | Sasser |
| 7,641,398 B2 | 1/2010 | O'Riorden |
| 7,695,199 B2 | 4/2010 | Teo |
| 7,712,970 B1 | 5/2010 | Lee |
| 7,717,625 B2 | 5/2010 | Margolin |
| 7,824,113 B2 | 11/2010 | Wong |
| 7,837,395 B2 | 11/2010 | Lin |
| D641,708 S | 7/2011 | Yamauchi |
| 8,083,450 B1 | 12/2011 | Smith |
| 8,152,385 B2 | 4/2012 | de Jong |
| 8,186,890 B2 | 5/2012 | Lu |
| 8,192,091 B2 | 6/2012 | Hsu |
| 8,202,009 B2 | 6/2012 | Lin |
| 8,221,007 B2 | 7/2012 | Peterhans |
| 8,251,733 B2 | 8/2012 | Wu |
| 8,267,595 B2 | 9/2012 | Lin |
| 8,270,796 B2 | 9/2012 | Nhep |
| 8,408,815 B2 | 4/2013 | Lin |
| 8,414,196 B2 | 4/2013 | Lu |
| 8,465,317 B2 | 6/2013 | Gniadek |
| 8,534,928 B2 | 9/2013 | Cooke |
| 8,550,728 B2 | 10/2013 | Takahashi et al. |
| 8,556,645 B2 | 10/2013 | Crain |
| 8,559,781 B2 | 10/2013 | Childers |
| 8,622,634 B2 | 1/2014 | Arnold |
| 8,636,424 B2 | 1/2014 | Kuffel |
| 8,651,749 B2 | 2/2014 | Dainese Júnior |
| 8,676,022 B2 | 3/2014 | Jones |
| 8,678,670 B2 | 3/2014 | Takahashi |
| 8,727,638 B2 | 5/2014 | Lee |
| 8,757,894 B2 | 6/2014 | Katoh |
| 8,764,308 B2 | 7/2014 | Irwin |
| 8,770,863 B2 | 7/2014 | Cooke |
| 8,869,661 B2 | 10/2014 | Opstad |
| 9,052,474 B2 | 6/2015 | Jiang |
| 9,063,296 B2 | 6/2015 | Dong |
| 9,250,402 B2 | 2/2016 | Ishii |
| 9,310,569 B2 | 4/2016 | Lee |
| 9,366,829 B2 | 6/2016 | Czosnowski |
| 9,411,110 B2 | 8/2016 | Barnette, Jr. |
| 9,448,370 B2 | 9/2016 | Xue |
| 9,465,172 B2 | 10/2016 | Shih |
| 9,494,744 B2 | 11/2016 | de Jong |

(56) References Cited

U.S. PATENT DOCUMENTS

| | | |
|---|---|---|
| 9,548,557 B2 | 1/2017 | Liu |
| 9,551,842 B2 | 1/2017 | Theuerkorn |
| 9,557,495 B2 | 1/2017 | Raven |
| 9,568,686 B2 | 2/2017 | Fewkes |
| 9,581,768 B1 | 2/2017 | Baca |
| 9,599,778 B2 | 3/2017 | Wong |
| 9,658,409 B2 | 5/2017 | Gniadek |
| 9,684,130 B2 | 6/2017 | Veatch |
| 9,684,313 B2 | 6/2017 | Chajec |
| 9,709,753 B1 | 7/2017 | Chang |
| 9,778,425 B2 | 10/2017 | Nguyen |
| 9,829,645 B2 | 11/2017 | Good |
| 9,829,653 B1 | 11/2017 | Nishiguchi |
| 9,869,825 B2 | 1/2018 | Bailey |
| 9,880,361 B2 | 1/2018 | Childers |
| 9,946,035 B2 | 4/2018 | Gustafson |
| 9,989,711 B2 | 6/2018 | Ott |
| 10,031,296 B2 | 7/2018 | Good |
| 10,067,301 B2 | 9/2018 | Murray |
| 10,107,972 B1 | 10/2018 | Gniadek |
| 10,114,180 B2 | 10/2018 | Suzic |
| 10,146,011 B2 | 12/2018 | Nhep |
| 2002/0168148 A1 | 11/2002 | Gilliland |
| 2002/0191919 A1 | 12/2002 | Nolan |
| 2003/0053787 A1 | 3/2003 | Lee |
| 2003/0063862 A1 | 4/2003 | Fillion |
| 2003/0157825 A1 | 8/2003 | Kane |
| 2004/0052473 A1 | 3/2004 | Seo |
| 2004/0109646 A1 | 6/2004 | Anderson |
| 2004/0136657 A1 | 7/2004 | Ngo |
| 2004/0141693 A1 | 7/2004 | Szilagyi |
| 2004/0161958 A1 | 8/2004 | Togami |
| 2004/0234209 A1 | 11/2004 | Cox |
| 2004/0247252 A1 | 12/2004 | Ehrenreich |
| 2005/0036744 A1 | 2/2005 | Caveney |
| 2005/0111796 A1 | 5/2005 | Matasek |
| 2006/0013539 A1 | 1/2006 | Thaler |
| 2006/0076061 A1 | 4/2006 | Bush |
| 2006/0089049 A1 | 4/2006 | Sedor |
| 2006/0127025 A1 | 6/2006 | Haberman |
| 2006/0153503 A1 | 7/2006 | Suzuki et al. |
| 2006/0160429 A1 | 7/2006 | Dawiedczyk |
| 2006/0193562 A1 | 8/2006 | Theuerkorn |
| 2006/0274411 A1 | 12/2006 | Yamauchi |
| 2007/0025665 A1 | 2/2007 | Dean |
| 2007/0028409 A1 | 2/2007 | Yamada |
| 2007/0079854 A1 | 4/2007 | You |
| 2007/0098329 A1 | 5/2007 | Shimoji |
| 2007/0149028 A1 | 6/2007 | Yu |
| 2007/0149062 A1 | 6/2007 | Long |
| 2007/0230874 A1 | 10/2007 | Lin |
| 2007/0232115 A1 | 10/2007 | Burke |
| 2007/0243749 A1 | 10/2007 | Wu |
| 2008/0008430 A1 | 1/2008 | Kewitsch |
| 2008/0044137 A1 | 2/2008 | Luther |
| 2008/0056647 A1 | 3/2008 | Margolin |
| 2008/0064334 A1 | 3/2008 | Hamadi |
| 2008/0226237 A1 | 9/2008 | O'Riorden |
| 2009/0022457 A1 | 1/2009 | de Jong |
| 2009/0028507 A1 | 1/2009 | Jones |
| 2009/0047818 A1 | 2/2009 | Irwin |
| 2009/0176401 A1 | 7/2009 | Gu |
| 2009/0196555 A1 | 8/2009 | Lin |
| 2009/0214162 A1 | 8/2009 | O'Riorden |
| 2009/0290938 A1 | 11/2009 | Asaoka |
| 2010/0054668 A1 | 3/2010 | Nelson |
| 2010/0061069 A1 | 3/2010 | Cole |
| 2010/0092136 A1 | 4/2010 | Nhep |
| 2010/0220961 A1 | 9/2010 | de Jong |
| 2010/0247041 A1 | 9/2010 | Szilagyi |
| 2010/0284656 A1 | 11/2010 | Morra |
| 2011/0044588 A1 | 2/2011 | Larson |
| 2011/0058773 A1 | 3/2011 | Peterhans |
| 2011/0131801 A1 | 6/2011 | Nelson |
| 2011/0155810 A1 | 6/2011 | Taniguchi |
| 2011/0177710 A1 | 7/2011 | Tobey |
| 2011/0239220 A1 | 9/2011 | Gibson |
| 2012/0155810 A1 | 6/2012 | Nakagawa |
| 2012/0189260 A1 | 7/2012 | Kowalczyk |
| 2012/0237177 A1 | 9/2012 | Minota |
| 2012/0269485 A1 | 10/2012 | Haley |
| 2012/0301080 A1 | 11/2012 | Gniadek |
| 2012/0308183 A1 | 12/2012 | Irwin et al. |
| 2012/0328248 A1 | 12/2012 | Larson et al. |
| 2013/0019423 A1 | 1/2013 | Srutkowski |
| 2013/0071067 A1 | 3/2013 | Lin |
| 2013/0094816 A1 | 4/2013 | Lin |
| 2013/0101258 A1 | 4/2013 | Hikosaka et al. |
| 2013/0121653 A1 | 5/2013 | Shitama |
| 2013/0170797 A1 | 7/2013 | Ott |
| 2013/0183012 A1 | 7/2013 | Cabanne Lopez |
| 2013/0216185 A1 | 8/2013 | Klavuhn |
| 2013/0308915 A1 | 11/2013 | Buff |
| 2014/0016901 A1 | 1/2014 | Lambourn |
| 2014/0050446 A1 | 2/2014 | Chang |
| 2014/0056562 A1 | 2/2014 | Limbert |
| 2014/0133808 A1 | 5/2014 | Hill |
| 2014/0169727 A1 | 6/2014 | Veatch |
| 2014/0226946 A1 | 8/2014 | Cooke |
| 2014/0241644 A1 | 8/2014 | Kang |
| 2014/0241678 A1 | 8/2014 | Bringuier |
| 2014/0241688 A1 | 8/2014 | Isenhour |
| 2014/0334780 A1 | 11/2014 | Nguyen |
| 2014/0348477 A1 | 11/2014 | Chang |
| 2015/0003788 A1 | 1/2015 | Chen |
| 2015/0111417 A1 | 4/2015 | Vanderwoud |
| 2015/0177463 A1 | 6/2015 | Lee |
| 2015/0198766 A1 | 7/2015 | Takahashi |
| 2015/0212282 A1 | 7/2015 | Lin |
| 2015/0241644 A1 | 8/2015 | Lee |
| 2015/0301294 A1 | 10/2015 | Chang |
| 2015/0331201 A1 | 11/2015 | Takano |
| 2015/0355417 A1 | 12/2015 | Takano |
| 2015/0370021 A1 | 12/2015 | Chan |
| 2016/0131849 A1 | 5/2016 | Takano |
| 2016/0139343 A1 | 5/2016 | Dean, Jr. |
| 2016/0161681 A1 | 6/2016 | Banal, Jr. |
| 2016/0172852 A1 | 6/2016 | Tamura |
| 2016/0231512 A1 | 8/2016 | Seki |
| 2016/0259135 A1 | 9/2016 | Gniadek |
| 2016/0266326 A1 | 9/2016 | Gniadek |
| 2016/0320572 A1 | 11/2016 | Gniadek |
| 2016/0349458 A1 | 12/2016 | Murray |
| 2016/0370545 A1 | 12/2016 | Jiang |
| 2017/0003458 A1 | 1/2017 | Gniadek |
| 2017/0205587 A1 | 7/2017 | Chang |
| 2017/0205590 A1 | 7/2017 | Bailey |
| 2017/0205591 A1 | 7/2017 | Takano |
| 2017/0212313 A1 | 7/2017 | Elenabaas et al. |
| 2017/0212316 A1 | 7/2017 | Takano |
| 2017/0254961 A1 | 9/2017 | Kamada |
| 2017/0276275 A1 | 9/2017 | Beemer |
| 2017/0276887 A1 | 9/2017 | Allen |
| 2017/0343740 A1 | 11/2017 | Nguyen |
| 2018/0128988 A1 | 5/2018 | Chang et al. |
| 2018/0156988 A1 | 6/2018 | Gniadek |
| 2018/0252872 A1 | 9/2018 | Chen |
| 2018/0341069 A1 | 11/2018 | Takano |
| 2019/0204513 A1 | 7/2019 | Davidson |
| 2020/0081201 A1* | 3/2020 | Wong .................. G02B 6/3897 |

FOREIGN PATENT DOCUMENTS

| | | |
|---|---|---|
| DE | 19507669 C2 | 10/1998 |
| DE | 202006011910 U1 | 4/2007 |
| DE | 102006019335 A1 | 10/2007 |
| EP | 1211537 A3 | 6/2002 |
| EP | 1245980 B1 | 6/2006 |
| EP | 1566674 B1 | 5/2009 |
| GB | 2111240 B | 9/1985 |
| JP | 2000089059 A | 3/2000 |
| JP | 03752331 B2 | 3/2006 |
| JP | 2009229545 A | 10/2009 |
| JP | 2009276493 A | 11/2009 |

(56) References Cited

FOREIGN PATENT DOCUMENTS

| | | |
|---|---|---|
| JP | 04377820 B2 | 12/2009 |
| KR | 200905382 U | 6/2009 |
| KR | 1371686 B1 | 3/2014 |
| TW | 200821653 A | 5/2008 |
| WO | WO2001019904 A1 | 3/2001 |
| WO | WO2001079904 A3 | 3/2002 |
| WO | WO2004027485 A1 | 4/2004 |
| WO | WO2006007120 A1 | 1/2006 |
| WO | WO2010024851 A3 | 6/2010 |
| WO | WO2012136702 A1 | 10/2012 |
| WO | WO2015103783 A1 | 7/2015 |
| WO | WO2016019993 A1 | 2/2016 |
| WO | WO2019126333 A1 | 6/2019 |

OTHER PUBLICATIONS

Fiber Optic Connectors and Assemblies Catalog, 2009, Huber & Suhner Fiber Optics, Herisau, Switzerland.

Fiber Optic Interconnect Solutions, Tactical Fiber Optic Connector Cables and Termini, 2006, Glenair, Inc., Glendale, California.

Fiber Optic Products Catalog, Nov. 2007, Tyco Electronics Corporation, Harrisburg, Pennsylvania.

Final Office Action, U.S. Appl. No. 16/035,691, dated Feb. 11, 2019, pp. 8.

Non-Final Office Action, U.S. Appl. No. 16/035,695, dated Sep. 28, 2018, pp. 7.

International Search Report and Written Opinion for Application No. PCT/US2018/62406 dated Mar. 18, 2019, 12, pages, United States.

International Search Report and Written Opinion for Application No. PCT/US2019/40700 dated Sep. 27, 2019, 12, pages, United States.

International Search Report and Written Opinion for Application No. PCT/US2019/50895 dated Jan. 6, 2020, 12, pages, United States.

International Search Report and Written Opinion for Application No. PCT/US2019/50909 dated Dec. 17, 2019, 11, pages, United States.

International Search Report and Written Opinion for Application No. PCT/US2019/56564 dated Jan. 14, 2020, 14, pages, United States.

International Search Report and Written Opinion, Application No. PCT/US2018/056133, dated Jan. 1, 2019, pp. 7.

International Search Report and Written Opinion, Application No. PCT/US/2018/042202, pp. 17, dated Dec. 7, 2018.

International Search Report and Written Opinion, Application No. PCT/US2018/62405, dated Apr. 3, 2019, pp. 17.

International Search Report and Written Opinion, Application No. PCT/US19/24718, dated Jun. 26, 2019, pp. 7.

International Search Report and Written opinion for Application No. PCT/US2019/013861, dated Apr. 8, 2019, 14 pages.

\* cited by examiner

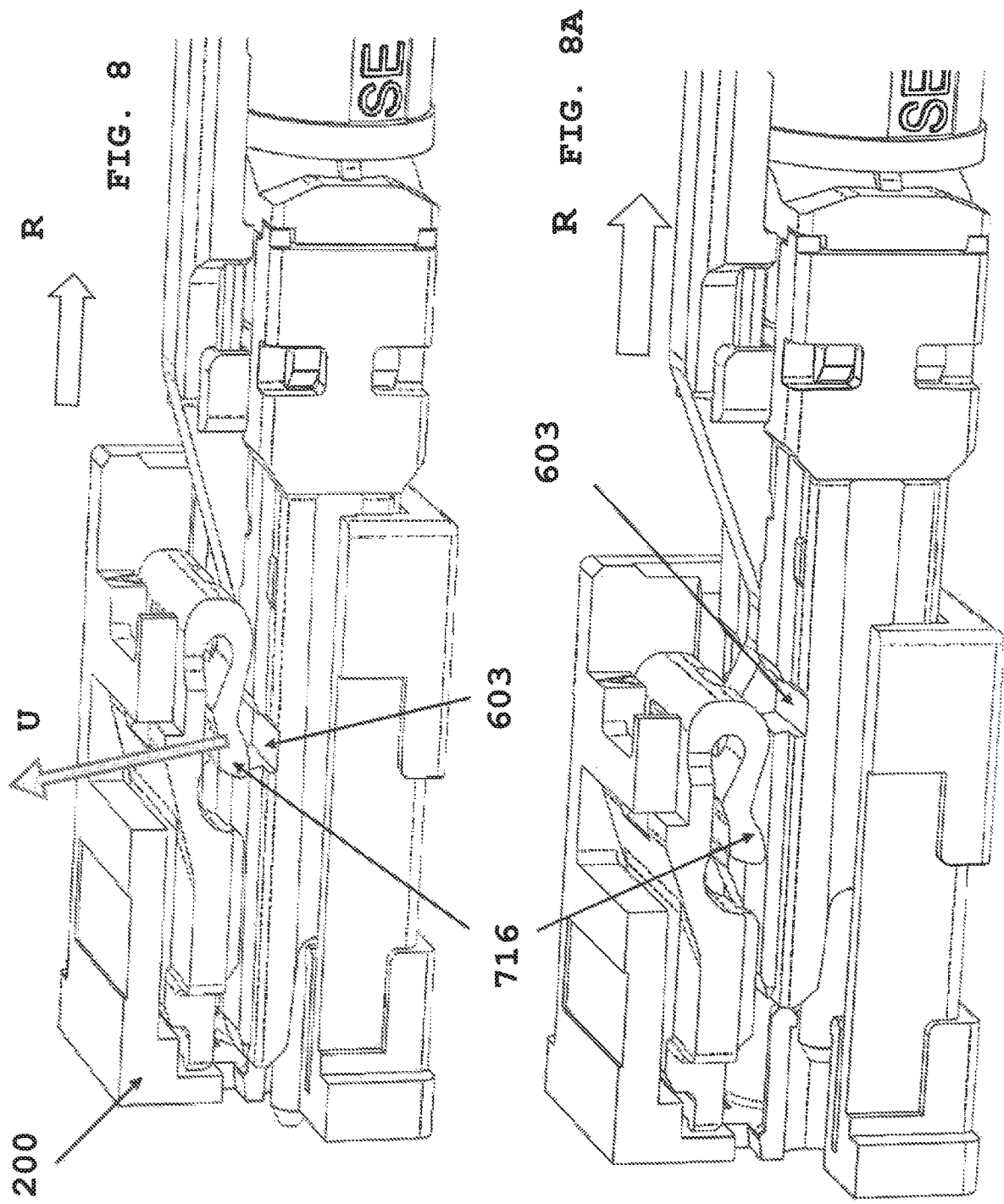

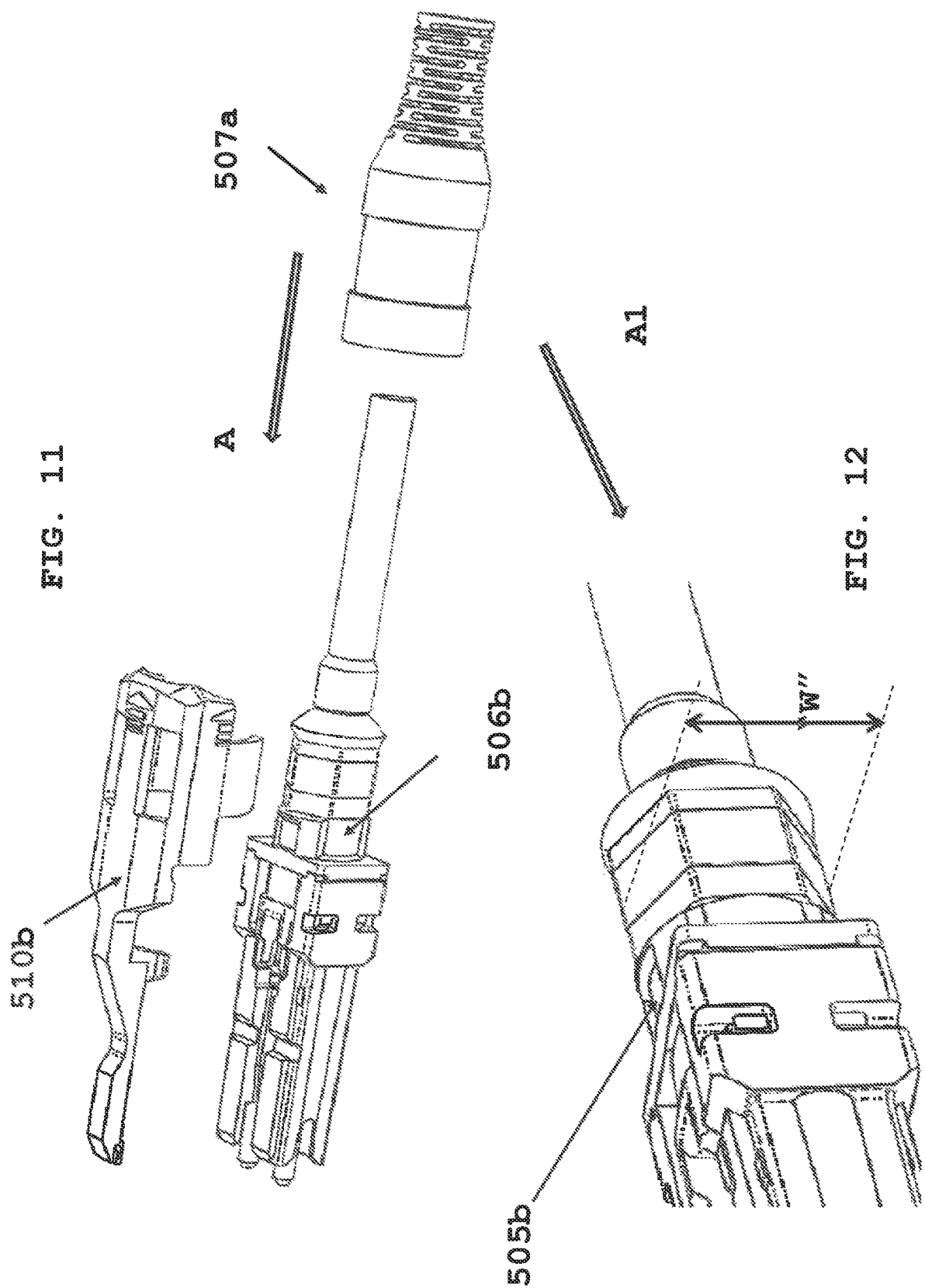

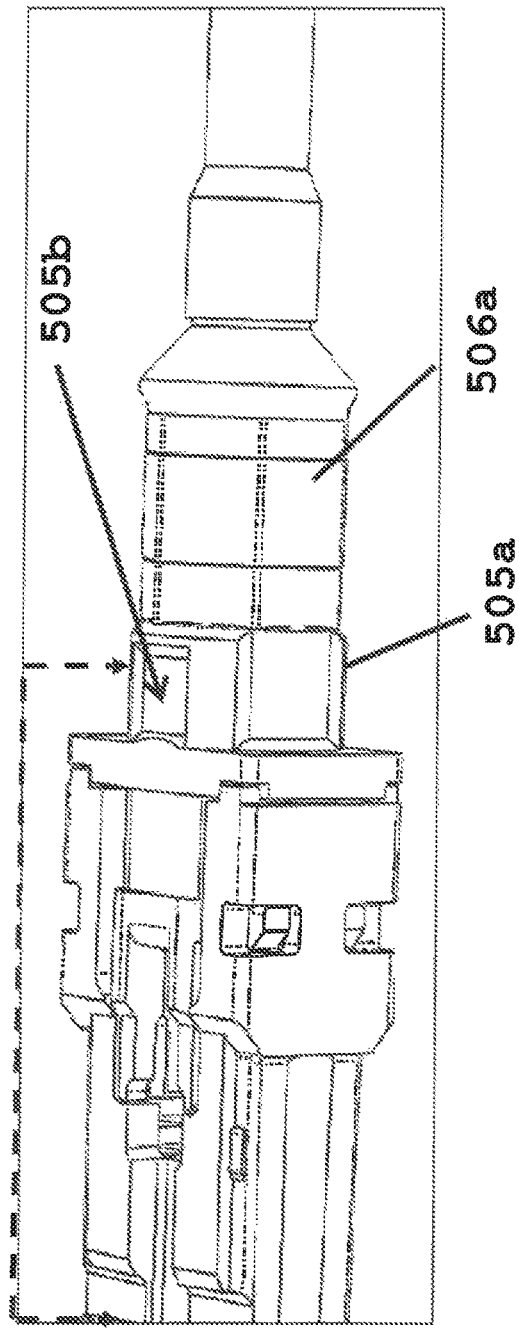
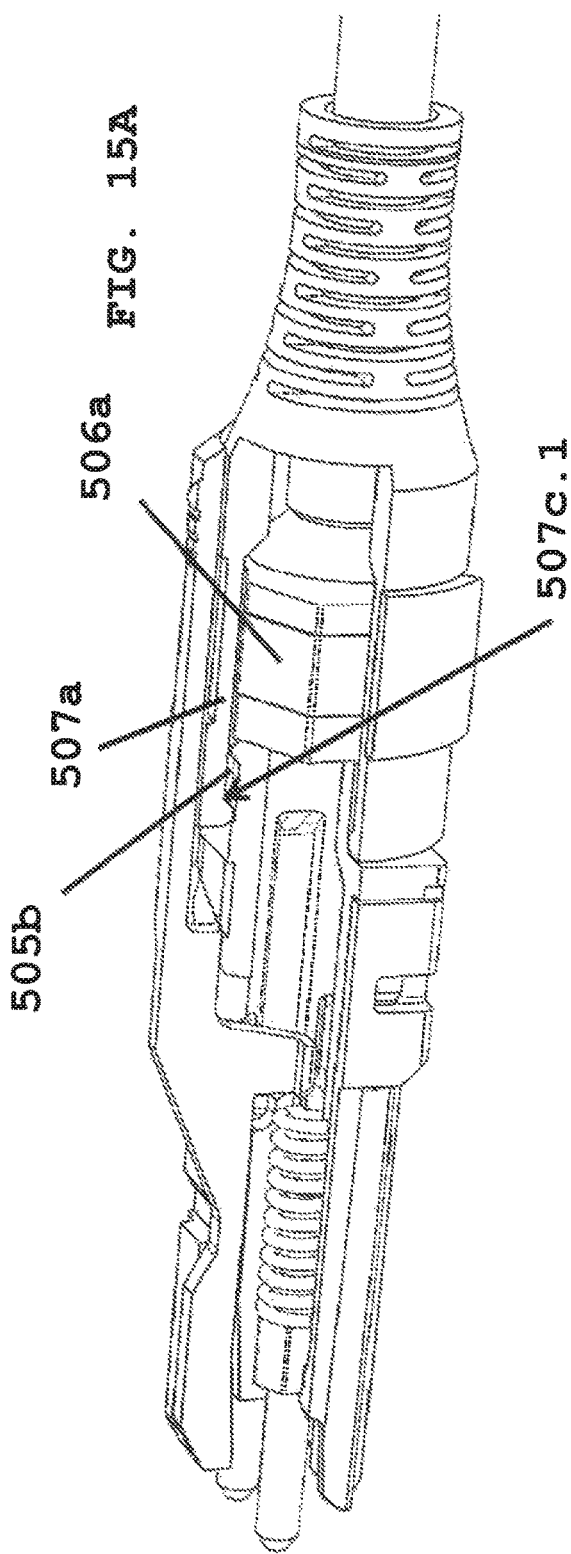

LC TYPE CONNECTOR WITH PUSH/PULL ASSEMBLY FOR RELEASING CONNECTOR FROM A RECEPTACLE USING A CABLE BOOT

CROSS-REFERENCE TO RELATED-APPLICATIONS

This application is continuation-in-part of U.S. Provisional Application No. 62/730,373 filed on Sep. 12, 2018, entitled "LC Type Connector with Clip on Push/Pull Tab for Releasing Connector from a Receptacle using Cable Boot", and is a continuation-in-part of U.S. patent application Ser. No. 16/199,139 filed on Nov. 24, 2018 title "LC Type Connector with Clip on Push/Pull Tab for Releasing Connector from a Receptacle using Cable Boot", and is a continuation-in-part of U.S. patent application Ser. No. 16/539,854 filed Aug. 13, 2019, entitled "Cable Boot Assembly for Releasing Fiber Optic Connector from a Receptacle," each of which is incorporated herein by reference in its entirety.

BACKGROUND

The present disclosure relates generally to connectors deploying a release from a receptacle, and more specifically to narrow width adapters and connectors, such as narrow pitch distance Lucent Connector (LC) duplex adapters and narrow width multi-fiber connectors.

The prevalence of the Internet has led to unprecedented growth in communication networks. Consumer demand for service and increased competition has caused network providers to continuously find ways to improve quality of service while reducing cost.

Certain solutions have included deployment of high-density interconnect panels. High-density interconnect panels may be designed to consolidate the increasing volume of interconnections necessary to support the fast-growing networks into a compacted form factor, thereby increasing quality of service and decreasing costs such as floor space and support overhead. However, the deployment of high-density interconnect panels has not been fully realized.

In communication networks, such as data centers and switching networks, numerous interconnections between mating connectors may be compacted into high-density panels. Panel and connector producers may optimize for such high densities by shrinking the connector size and/or the spacing between adjacent connectors on the panel. While both approaches may be effective to increase the panel connector density, shrinking the connector size and/or spacing may also increase the support cost and diminish the quality of service.

In a high-density panel configuration, adjacent connectors and cable assemblies may obstruct access to individual the release mechanism to remove a connector from a receptacle. Such physical obstructions may impede the ability of an operator to minimize the stresses applied to the cables and the connectors. For example, these stresses may be applied when a user reaches into a dense group of connectors and pushes aside surrounding optical fibers and connectors to access an individual connector release mechanism with his/her thumb and forefinger. The typical connector access point is nearer the connector body. Overstressing the cables and connectors may produce latent defects, compromise the integrity and/or reliability of the terminations, and potentially cause serious disruptions to network performance.

While an operator may attempt to use a tool, such as a screwdriver, to reach into a dense group of connectors and activate a release mechanism, adjacent cables and connectors may obstruct the operator's line of sight, making it difficult to guide the tool to the release mechanism without pushing aside the adjacent cables. Moreover, even when the operator has a clear line of sight, guiding the tool to the release mechanism may be a time-consuming process. Thus, using a tool may not be effective at reducing support time and increasing the quality of service.

Small Form Factor Pluggable Transceivers (SFP) are used presently in telecommunication infrastructures within rack mounted copper-to-fiber media converters, and are also known as Ethernet switches and/or patching hubs. These infrastructure Ethernet and fiber optic connections are evolving quickly to increase connection density due to limited space for such equipment. Although fiber optic connectors have become smaller over the years, they have not been designed to be any smaller than necessary to plug into commonly sized and readily available SFPs. However, as transceiver technologies develop, smaller SFPs will be used to create higher density switches and/or patching hub equipment. Accordingly, there is a need for fiber optic connectors that will meet the needs of future developments in smaller SFPs.

SUMMARY

In summary, one aspect provides a connector comprising: a front body comprising: a top and a bottom, a recess running lengthwise on the top of the front body, and a rear body detachably connected to the front body forming a housing, wherein a portion of the rear body fits inside the front body when detachably connected, a cable boot with a crimp ring at proximal end, and an outer body with a recess configured to accept a push/pull tab; and a push-pull tab comprising a front portion, a rear portion, and one or more side portions, wherein the push-pull tab is detachably connected to the housing using the one or more side portions and detachably connected to the cable boot recess, wherein the front portion sits in the recess. Upon pulling upon the cable or cable boot, the connector is unsecured or released from a receptacle or adapter inner latching structure, when the push/pull tab connected to the cable boot via at least one wing that is secured within a recess formed within the cable boot itself. The cable boot has at least on inner protrusions that is moveable, secured within a recess or cut-out in back body of connector. Movement by pulling rearward releases connector from receptacle port. The recess is sized and shaped to allow from connector release with cable boot inner protrusion.

Another aspect provides a receiver device comprising: one or more ports for receiving a connector having a top and a bottom; the one or more ports comprising at least one cutout on the top; and the one or more ports comprising at least one guide rail on the bottom, wherein the at least one cutout is configured to receive an interchangeable anchor device.

A further aspect provides a network system comprising: a connector comprising a housing comprising a groove running widthwise on a surface of the housing; and a push-pull tab comprising a complementary groove, wherein the push-pull tab is detachably connected to the housing; and a receiver device comprising one or more ports for receiving the connector, the one or more ports having an interchangeable anchor device including a first portion and a second portion; wherein the groove is configured to receive the first portion of the interchangeable anchor device when the connector is inserted into the receiving element, and wherein the complimentary groove is configured to receive the second portion of the interchangeable anchor device when the connector is inserted into the receiving element, the push-pull tab being configured to disengage the second portion of the interchangeable anchor device from the complementary groove when the push-pull tab is moved in a direction away from the connector, thereby disengaging the first portion of the interchangeable anchor device from the grove of the connector.

In the present invention, the push-pull tab 510*a* of FIG. 5 is used with a cable boot release 507*a* assembly for releasing and inserting a fiber optic connector from an adapter receptacle. This reduces overall space requirements as the push/pull tab extends from the connector body over a cable, and the push/pull tab protrudes into valuable space between racks of connectors interconnecting the network. In one embodiment, the cable boot assembly moves over a back post or back body located with a connector housing. The back body is secured to a front housing using a latch and recess mechanism.

This cable boot assembly can be used with a LC or Lucent® connector, a SC or standard connector, a CS® or SN™ connector sold by the assignee of the present invention, or a MT ferrule or mechanical transfer ferrule connector used in MPO or multi-fiber push on connector. All these connector types have a ferrule with an optical fiber secured therein at a proximal end, and an incoming cable at a distal end. Applicant application U.S. Ser. No. 15/881,309 filed on Jan. 26, 2018, titled "Modular Connector and Adapter Devices", Inventor is Takano, is fully incorporated by reference herein.

Accordingly, there is a need for fiber optic connectors that will meet the needs of future developments allowing for smaller footprints, easier implementation, and easy field modification.

BRIEF DESCRIPTION OF THE DRAWINGS

FIG. 4C.1 is a zoomed view of anchor device being lifted prior and secured in recess at front of connector of FIG. 3A.

FIG. 4D.1 is a zoomed view of anchor device being lifted out of recess by pulling on push/pull tab.

FIG. 6A depicts is a perspective view of the push-pull tab pulled rearward of the connector assembly of FIG. 3B.

FIG. 8 depicts a view of anchor device being moved up and out of recess during removal of connector of FIG. 3A from receptacle.

FIG. 8A depicts a side view of a connector assembly of FIG. 3A with anchor device fully removed from recess.

FIG. 11 is a partial exploded view of FIG. 9.

FIG. 12 is a side view of the connector crimp ring prior to securing cable boot.

FIG. 15 is a perspective view of connector body without push/pull tab.

FIG. 15A is a partial cross-section of push/pull tab and cable boot secured to connector body.

DETAILED DESCRIPTION

This disclosure is not limited to the particular systems, devices and methods described, as these may vary. The terminology used in the description is for the purpose of describing the particular versions or embodiments only, and is not intended to limit the scope.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention. As used in this document, the term "comprising" means "including, but not limited to."

The following terms shall have, for the purposes of this application, the respective meanings set forth below.

A connector, as used herein, refers to a device and/or component thereof that connects a first module or cable to a second module or cable. The connector may be configured for fiber optic transmission or electrical signal transmission. The connector may be any suitable type now known or later developed, such as, for example, a ferrule connector (FC), a fiber distributed data interface (FDDI) connector, an LC connector, a mechanical transfer (MT) connector, a square connector (SC) connector, an SC duplex connector, or a straight tip (ST) connector. The connector may generally be defined by a connector housing body. In some embodiments, the housing body may incorporate any or all of the components described herein.

A "fiber optic cable" or an "optical cable" refers to a cable containing one or more optical fibers for conducting optical signals in beams of light. The optical fibers can be constructed from any suitable transparent material, including glass, fiberglass, and plastic. The cable can include a jacket or sheathing material surrounding the optical fibers. In addition, the cable can be connected to a connector on one end or on both ends of the cable.

Various embodiments described herein generally provide a remote release mechanism such that a user can remove cable assembly connectors that are closely spaced together on a high-density panel without damaging surrounding connectors, accidentally disconnecting surrounding connectors, disrupting transmissions through surrounding connectors, and/or the like. Various embodiments also provide narrow pitch LC duplex connectors and narrow width multi-fiber connectors, for use, for example, with future narrow pitch LC SFPs and future narrow width SFPs. The remote release mechanisms allow use of the narrow pitch LC duplex connectors and narrow width multi-fiber connectors in dense arrays of narrow pitch LC SFPs and narrow width multi-fiber SFPs.

Figure 1:
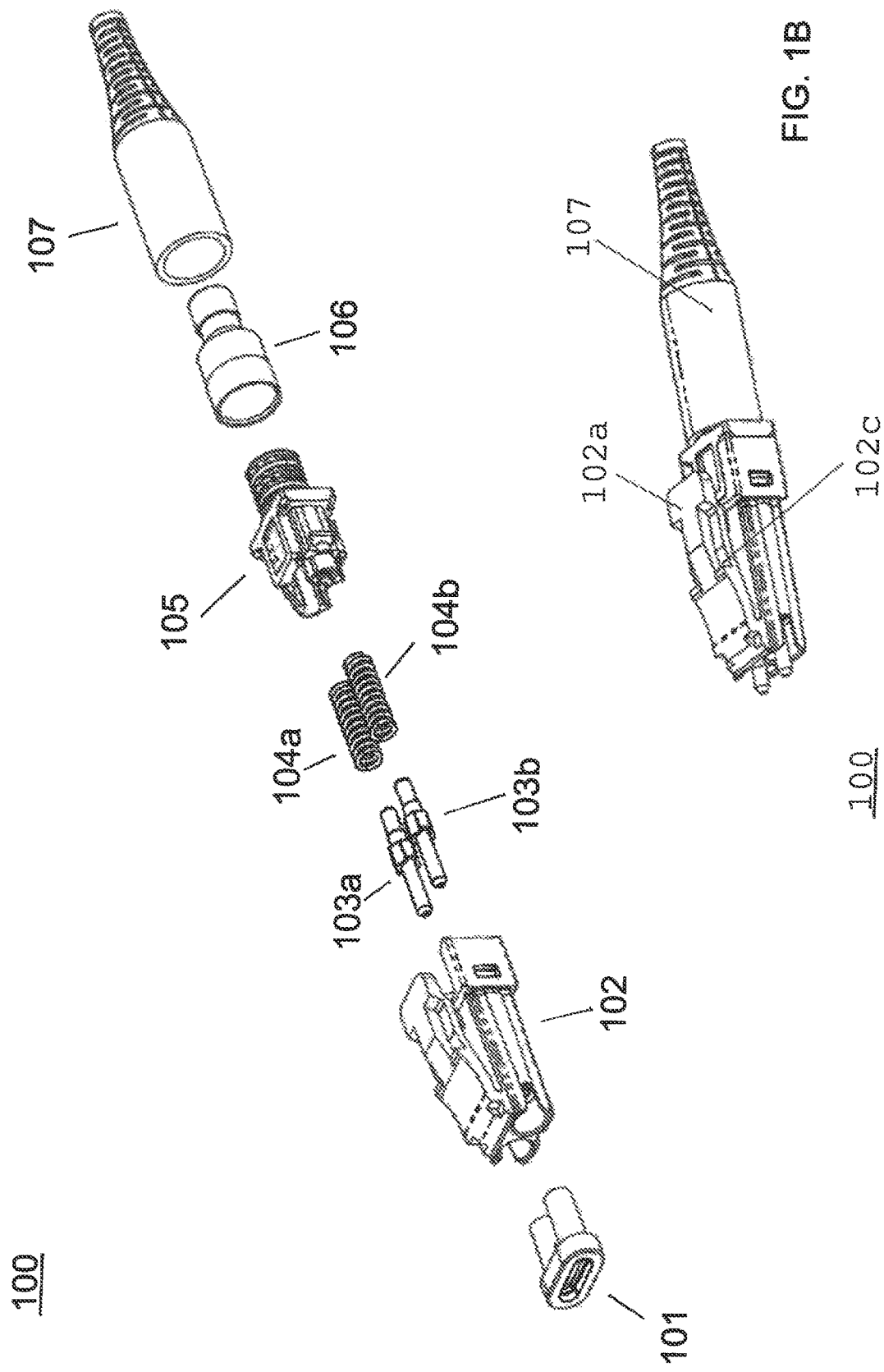
FIG. 1A is a perspective view of a prior art narrow pitch connector deploying a bend-latch release.
FIG. 1B is a perspective view of the bend latch connector of FIG. 1A assembled.
Figure 2:
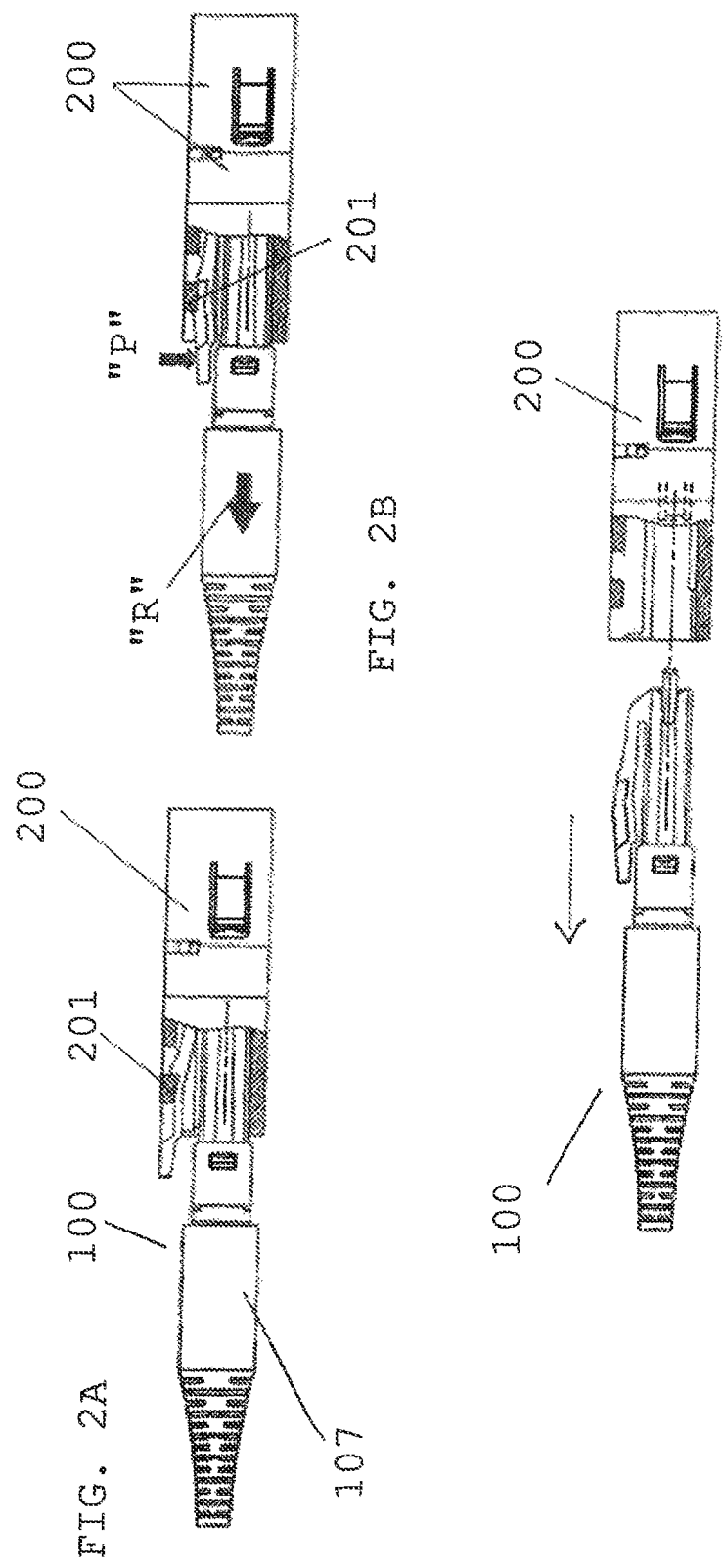
FIG. 2A is a perspective view of inserting the connector of FIG. 1A into a receptacle.
FIG. 2B is a perspective view of the connector of FIG. 1A at start of release from a receptacle.
FIG. 2C is a perspective view of the connector of FIG. 1A removed from a receptacle.
Figure 3:
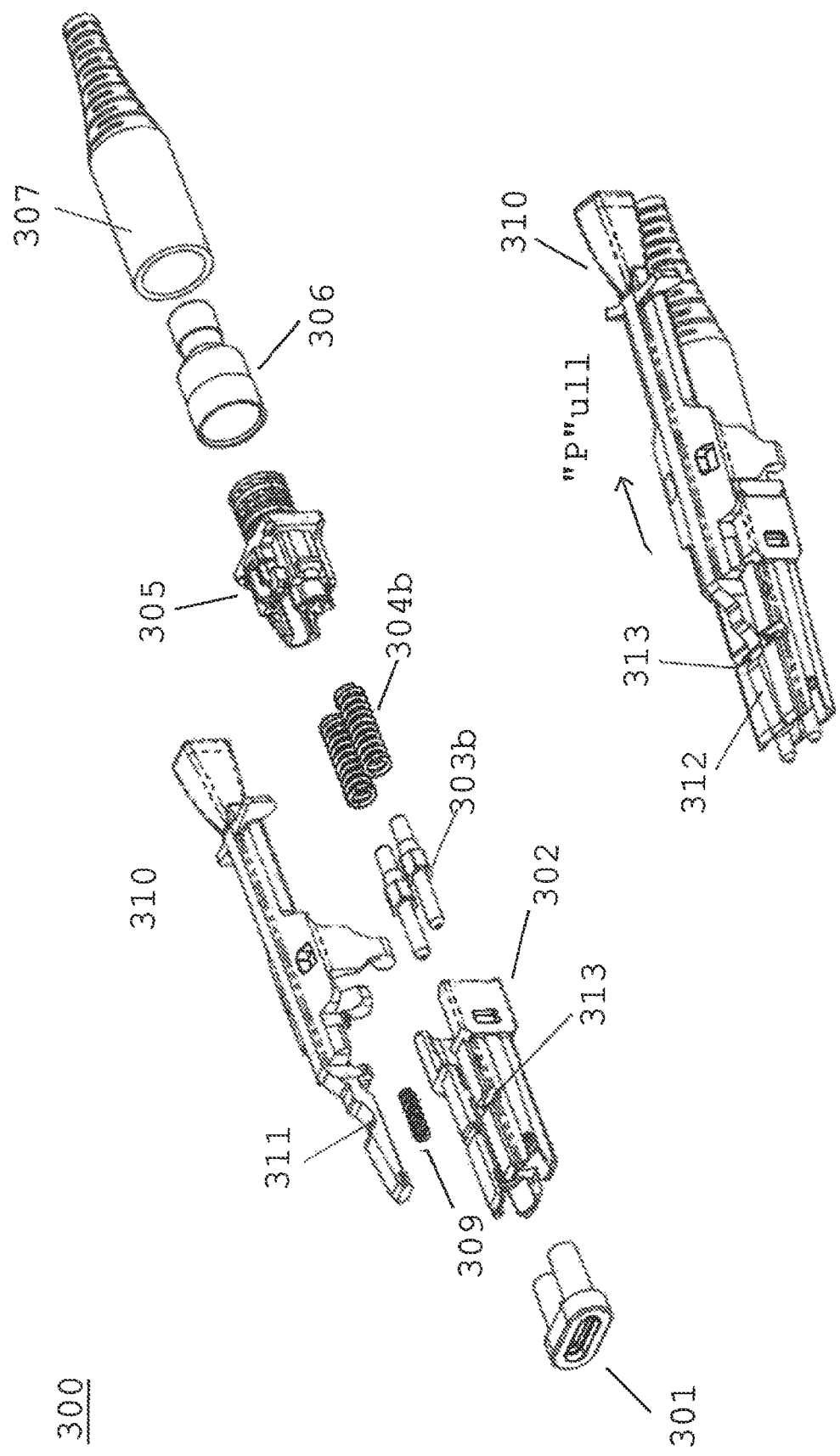
FIG. 3A is an exploded view of a prior art narrow pitch LC type connector.
FIG. 3B is an assembled view of FIG. 3A.
Figure 4:
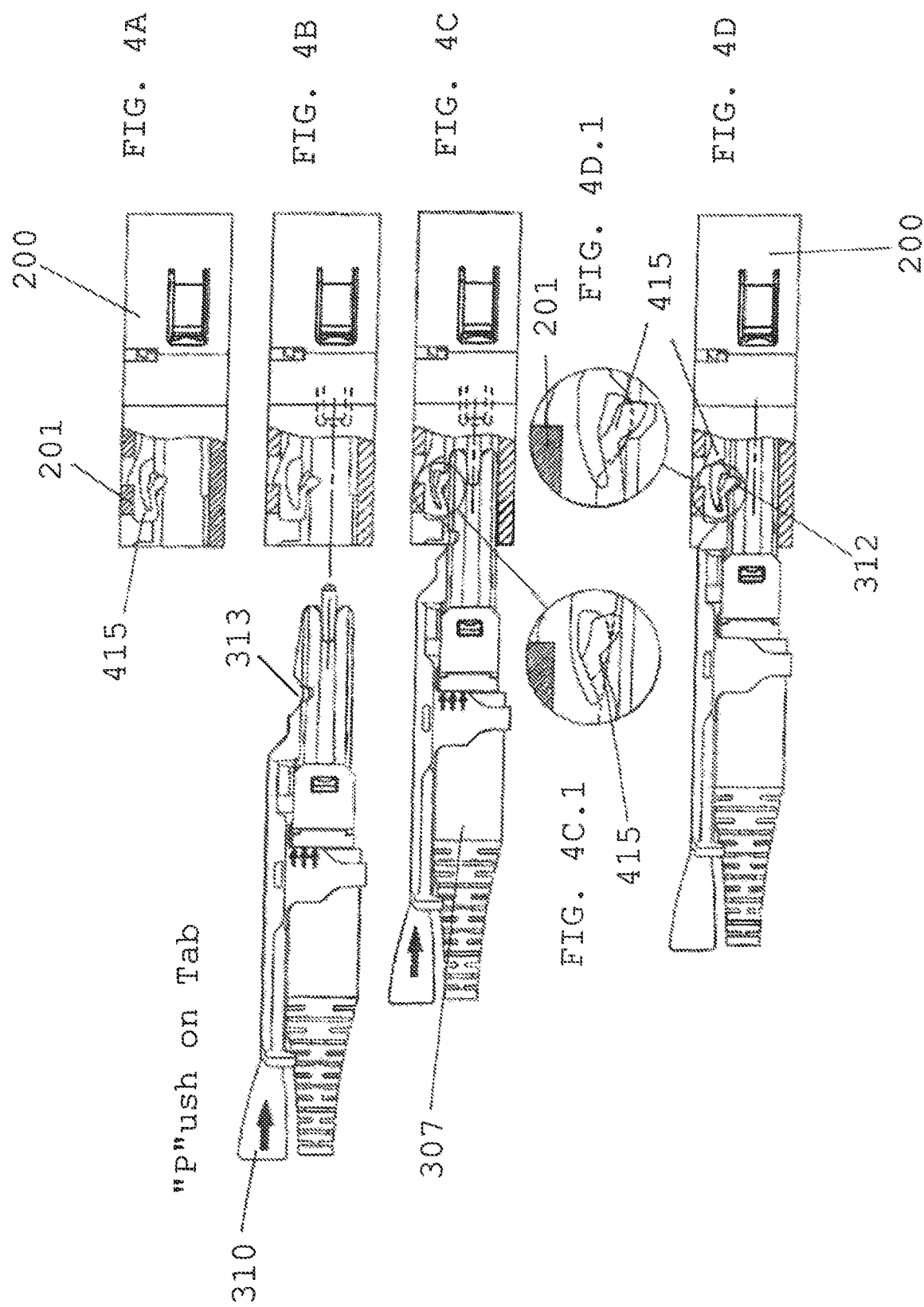
FIG. 4A is a perspective view of a receptacle with an anchor device within receptacle port.
FIG. 4B is a perspective view of FIG. 3B connector prior to insertion in receptacle of FIG. 4A.
FIG. 4C is a perspective view of FIG. 3B connector inserted into receptacle activating anchor device.
FIG. 4D is a perspective view of FIG. 3B connector being removed from receptacle.
Figure 6:
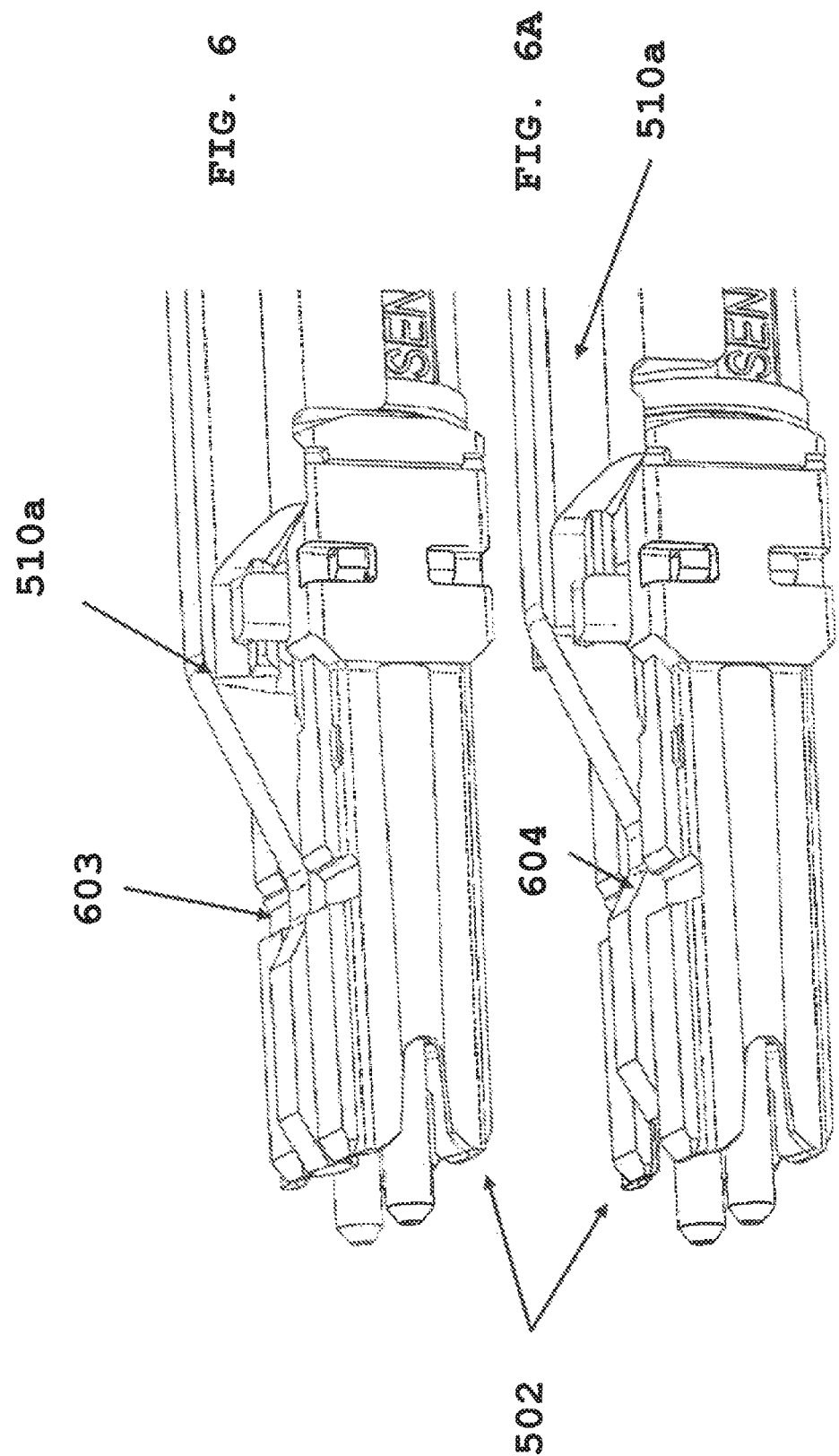
FIG. 6 depicts is a perspective view of a proximal end of a connector assembly of FIG. 3B.

FIG. 1A depicts a prior art bend latch connector. The connector 100 comprises a dust cap 101, front body 102, ferrule assembly (103a, 103b), ferrule bias springs (104a, 104b), a back body 105, crimp ring 106 and cable boot 107. FIG. 1B is FIG. 1A assembled. Bend latch 102a is depressed to release latch surface 102c secured within a receptacle (not shown). FIG. 2A depicts connector 100 secured within receptacle 200, with latch surface 102c secured behind cut out 201. FIG. 2B depicts removing connector 100 by depressing at "P" latch 102. FIG. 2C depicts pulling connector 100 rearward, in direction of arrow A, until the connector is removed from receptacle 200. To remove this connector, a user must depress the latch very close to the receptacle port. When there are connectors side-by-side, the user may depress a second connector latch or could loosen the second connector in a second port. This would result in signal loss. FIG. 3A depicts an exploded view of a LC type prior art connector with a push/pull tab. The push/pull tab 310 is secured about front body. A bias spring 309 maintains tab 310 in a forward position, as shown in FIG. 6. Ferrule 303b is biased forward by spring 304b, and the spring/ferrule are held within front body 305. Crimp ring 306 is secured to back body, and cable boot 037 is secured to crimp ring 306. FIG. 3B depicts assembled connector 300. A width-wise recess 313 receives an anchor device 715 secured within a receptacle 200, refer to FIG. 7 below, to secure connector 300 within receptacle 200. A ramp surface 312 lifts anchor device upward as push/pull tab 310 is pulled in direction of "P". FIG. 4A depicts receptacle 200 with an anchor device 415 secured behind receptacle cut out 201. FIG. 4B shows connector 300 being inserted using push/pull tab 310 into receptacle 200. FIG. 4C shows connector 300 with anchor device entering in width-wise recess. FIG. 4C.1 is a zoomed view of anchor device 415 being secured within width-wise recess on connector front body, as connector 300 is inserted into receptacle 200. FIG. 4D depicts anchor device 415 being lifted by ramp surface 312 of push/pull tab 301. FIG. 4D.1 is a zoomed view of anchor device being lifted out of width-wise recess by ramp surface 312 as connector 300 is removed by pulling rearward on push/pull tab 310.

Figure 5:
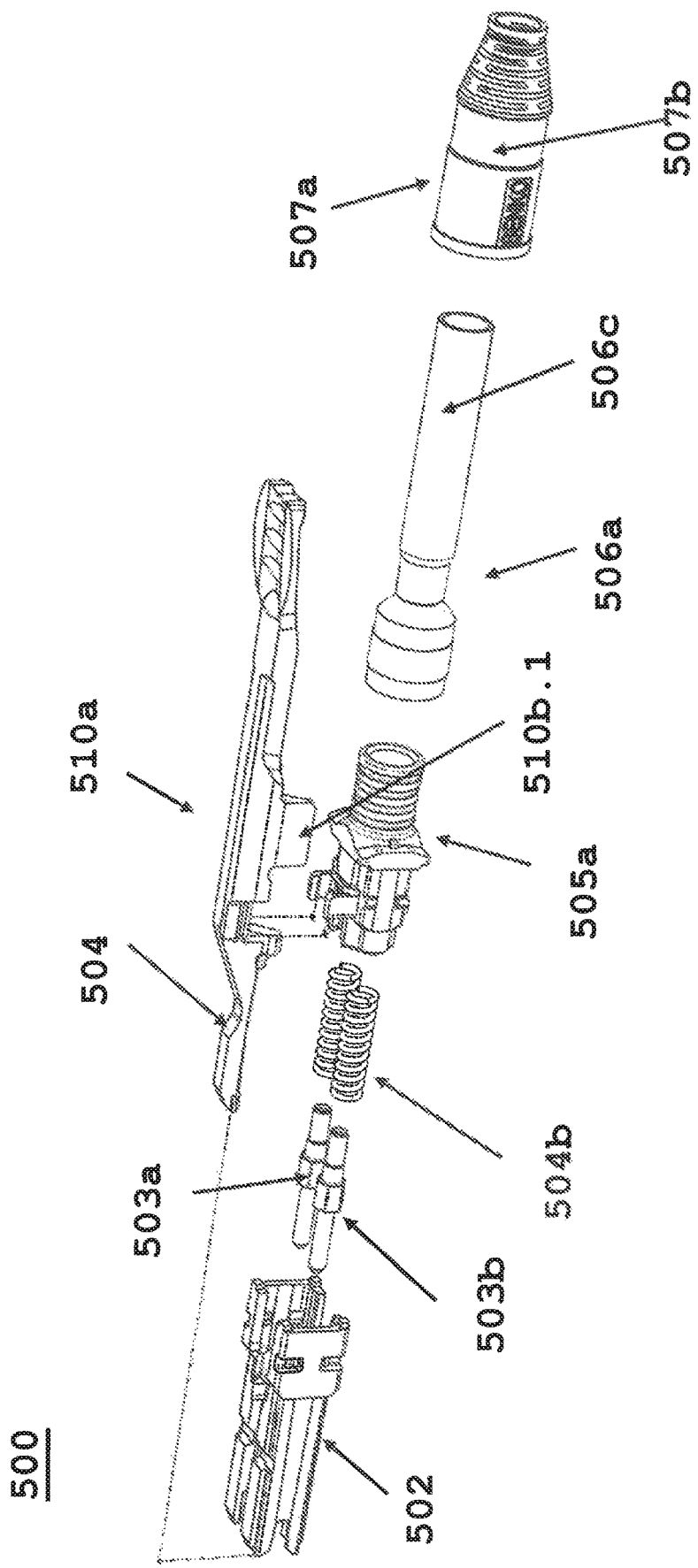
FIG. 5 depicts an exploded view of a connector assembly according to a first embodiment.

FIG. 5 depicts an exploded view of the present invention. Connector 500 comprises a front body 502 accepts ferrule 503b biased by spring 504b respectively, and held in place by back body 505a. Push/pull tab 510a attaches a proximal end of front body 502, is secured to back body 505a, and tab 510b.1 attaches about recess 507b of cable boot 507a. Cable boot 507a is secured about crimp ring 506a. Cable 506c jacket is secured and pressed with crimp ring 506a. Connector 500 is assembled from right to left. Ramp surface 504 lifts anchor device in recess 603 to release the connector from the receptacle port. FIG. 6A depicts a proximal end of connector 500 with push/pull tab 510a biased forward, and width-wise recess 603. FIG. 6B depicts connector 500 being pull rearward using push/pull tab 510a, where ramp surface 604 would lift an anchor device (not shown) within receptacle port.

Figure 7:
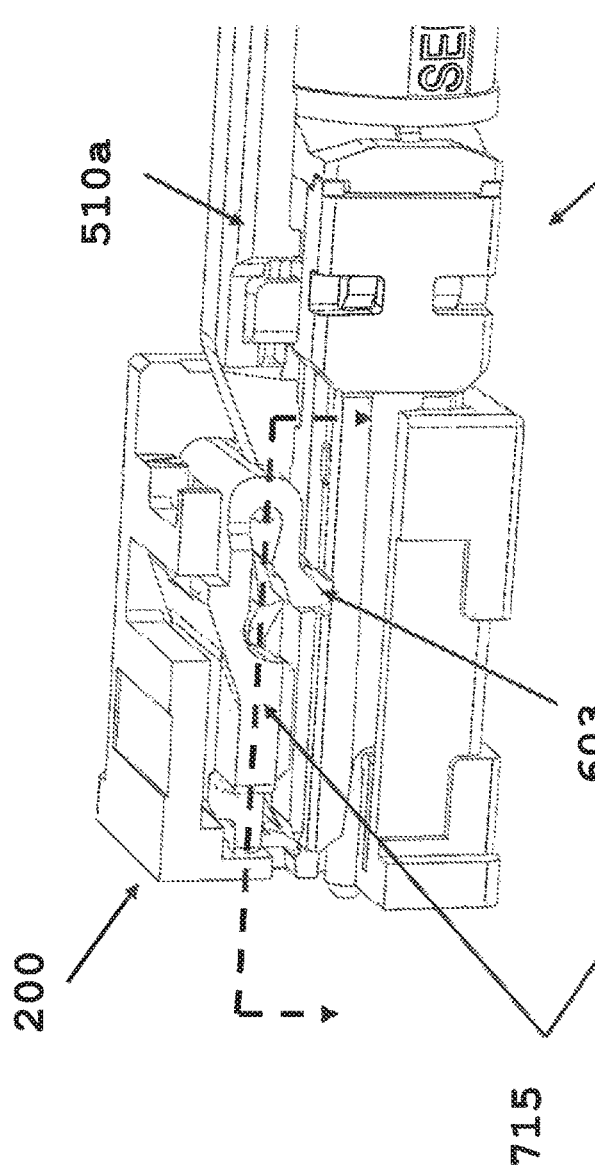
FIG. 7 depicts a cross-section view of a receptacle having the connector of FIG. 6 therein.
Figure 7A:
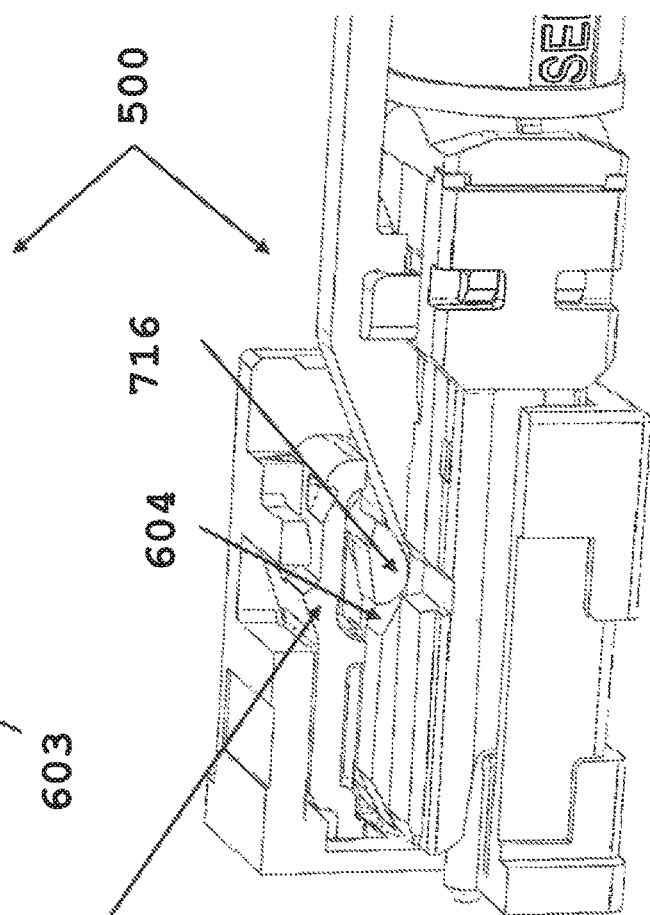
FIG. 7A depicts a further cross-section taken of FIG. 6A while connector is being removed from receptacle.

FIG. 7 depicts anchor device 715 retained within recess 603 that secures connector 500 in receptacle 200 port. FIG. 7A depicts a cross-section of FIG. 7 showing anchor device leg 716 within recess 603, and up against ramp surface 604, which is integrated with push/pull tab 510a, FIG. 8 depicts removing in direction of arrow R connector 500 from receptacle 200. Anchor leg 716 is lifted up (in direction of arrow U) by ramp surface 604. FIG. 8A depicts further rearward removal of the connector from the receptacle, where the anchor leg 716 is out of recess 603, and now released from the receptacle port.

Figure 9:
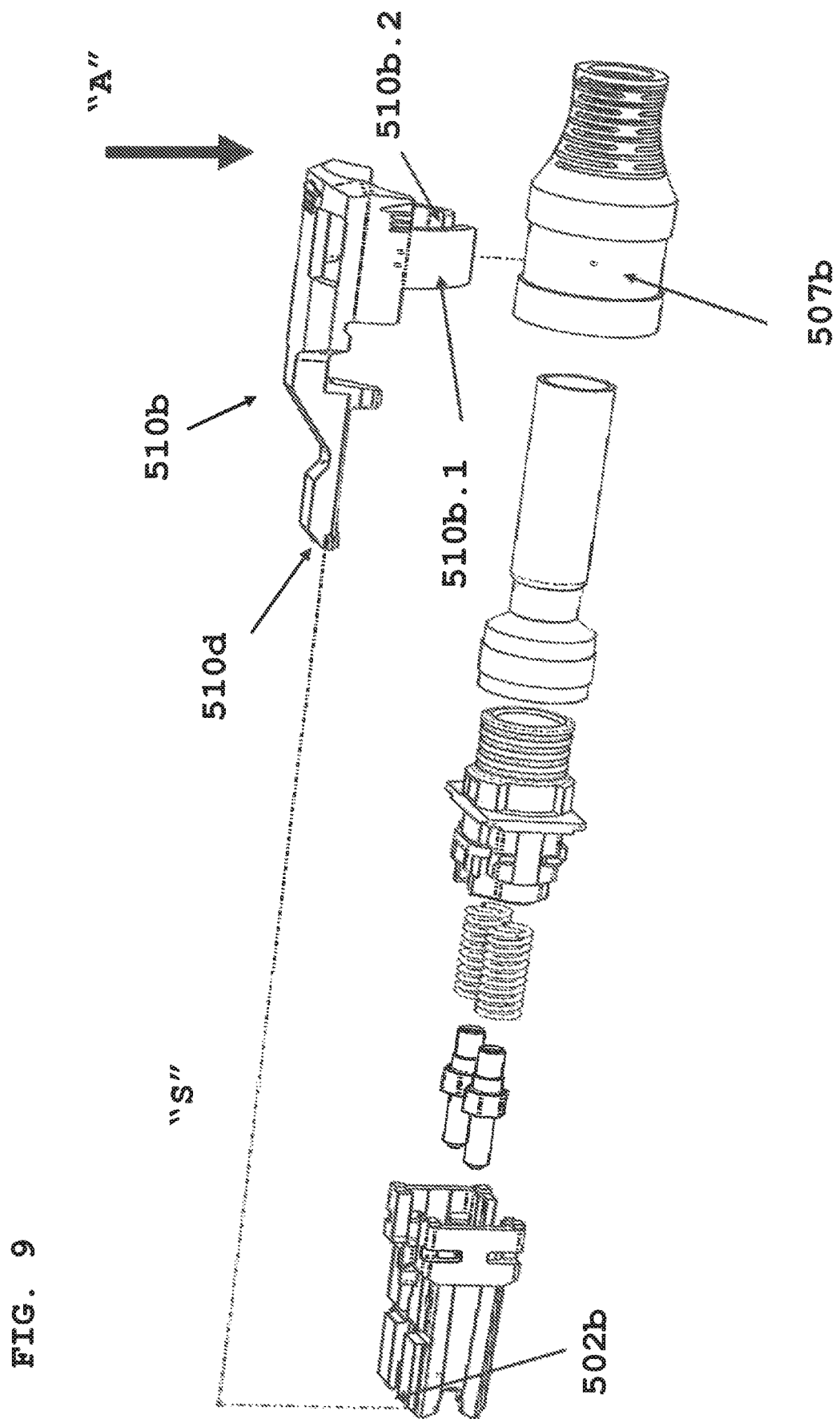
FIG. 9 is an exploded view of the present invention.
Figure 10:
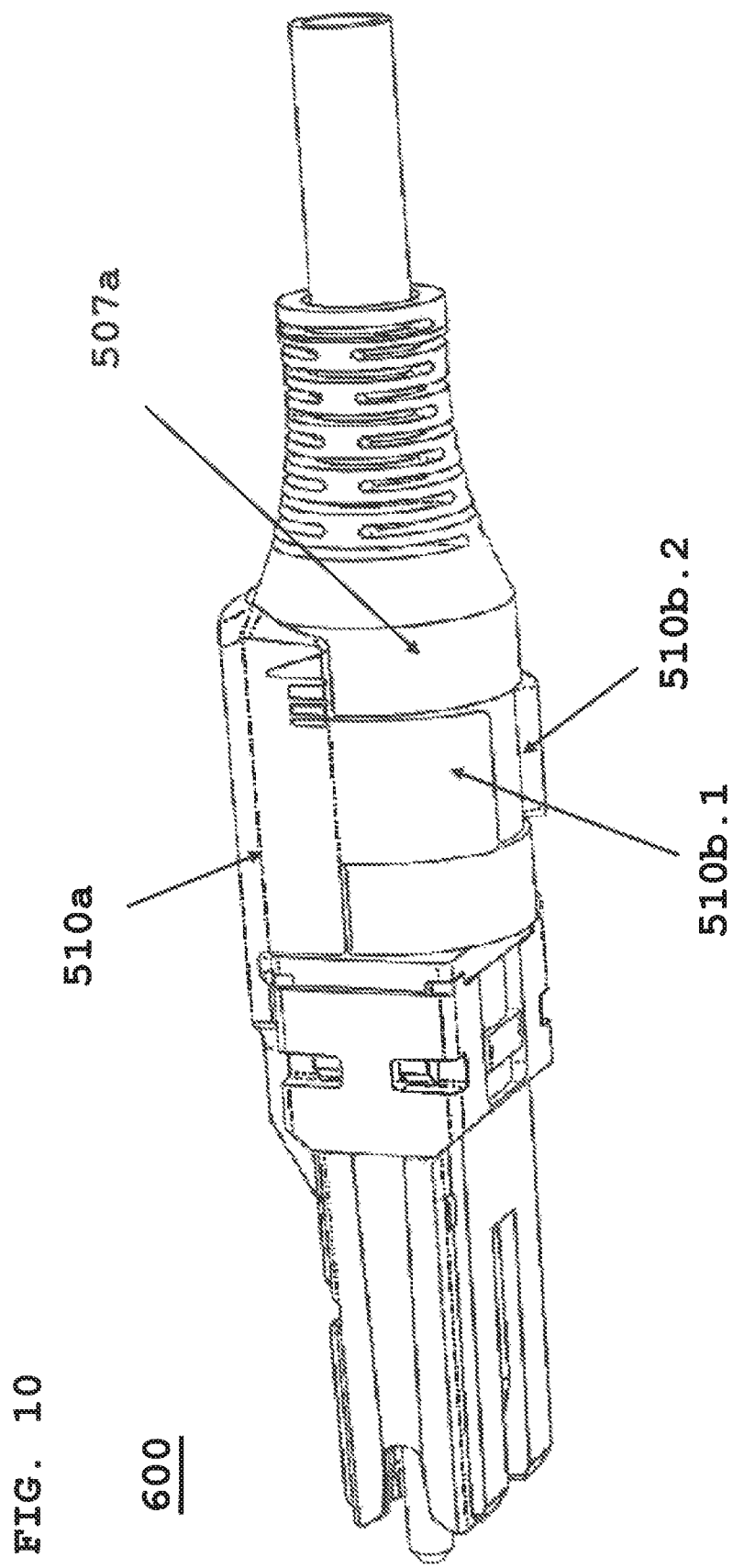
FIG. 10 is an assembled bottom view of the connector assembly of FIG. 9.

FIG. 9 is an exploded view of connector 500 prior to assembly of push/pull clip 510b, a second embodiment of the present invention. Proximal end 510d of clip 510b is secured to a proximal end 502b of front body, and wings 510b.1, 510b.2 are secured about circumferential recess 507b formed as part of the cable boot. Assembly is in direction of arrow "A" of push/pull clip 510b onto cable boot 507a. FIG. 10 depicts connector 600 with push/pull clip 510a assembled with wings (510b.1, 510b.2) secured about recess of cable boot 507a. FIG. 11 depicts an exploded view of securing cable boot 507a onto crimp sleeve 506b in direction of arrow "A". FIG. 12 depicts a zoomed view of crimp sleeve "W" width. Width "W" is the maximum outside dimension of crimp ring 506a over which cable boot 507a is placed. The inside dimension of cable boot 506a is sized to allow cable boot to be inserted over crimp ring sleeve 506b. This allows cable boot 507a to be secured onto back body 505a, using back body cut out 505b. Since back body 505a is secured to front body 502a, and push/pull clip 510a is secured about cable boot 506a, a rearward pulling on cable 506c or cable boot 507a will release connector (500, 600) from a receptacle port.

Figure 13:
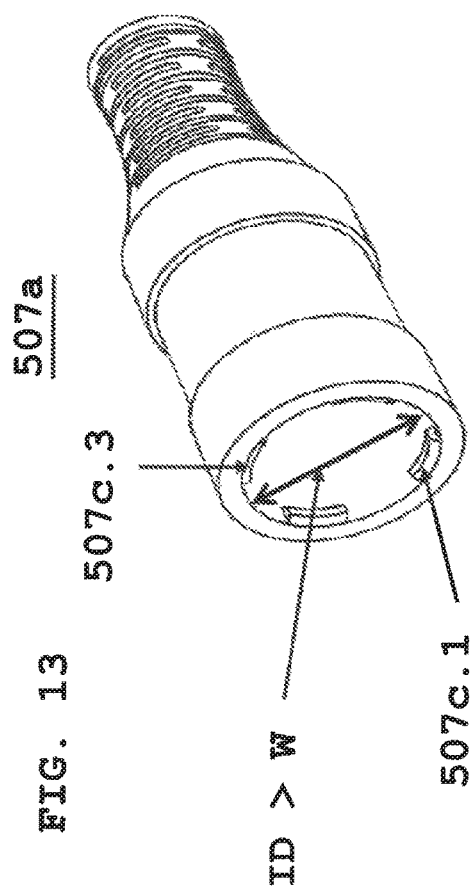
FIG. 13 is a front view of cable boot.
Figure 14:
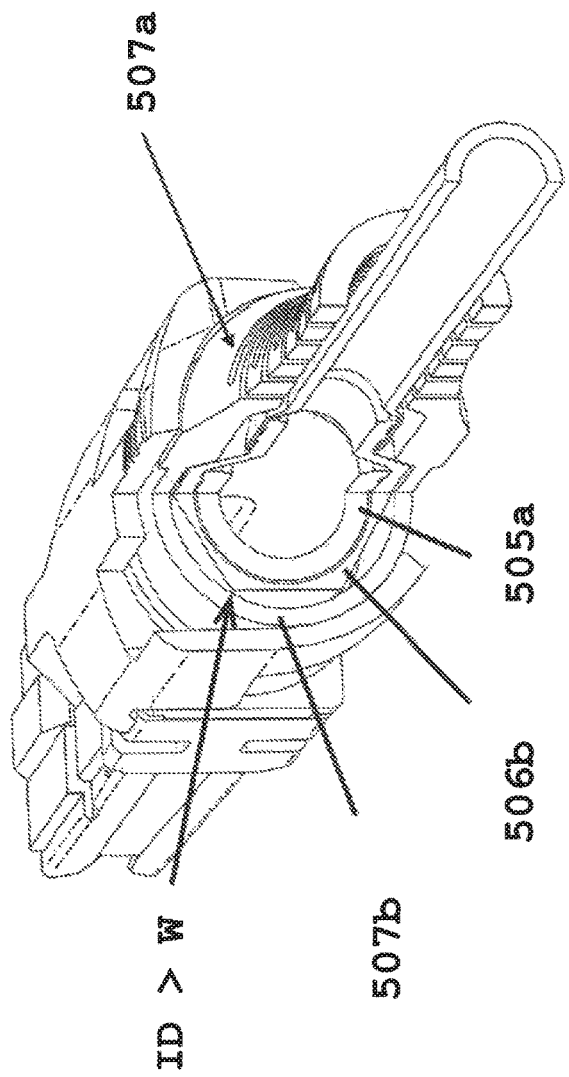
FIG. 14 is a cross-section of cable boot secured over rear of connector.

FIG. 13 depicts cable boot 507a. The inner diameter of cable boot at a proximal end opening, is slightly larger than the "W" of crimp ring sleeve 506b. Protrusions 507c.1 thru 507c.3, on an inside surface of cable boot. Cable boot 507a may have one or more protrusions that are secured within a corresponding cut out 505b on an outside surface of back body 505a. This secures and positions cable boot 507a over back body 505a. FIG. 14 is a cross-section cut-out of rear view of cable boot 507a secured over crimp ring sleeve 506b, and back body 505a is crimped over crimp ring. The cable boot is integrated with connector (550, 600), and by assembling the push/pull clip as shown in FIG. 10, a pull rearward on cable or cable boot will release connector from receptacle port.

Figure 16:
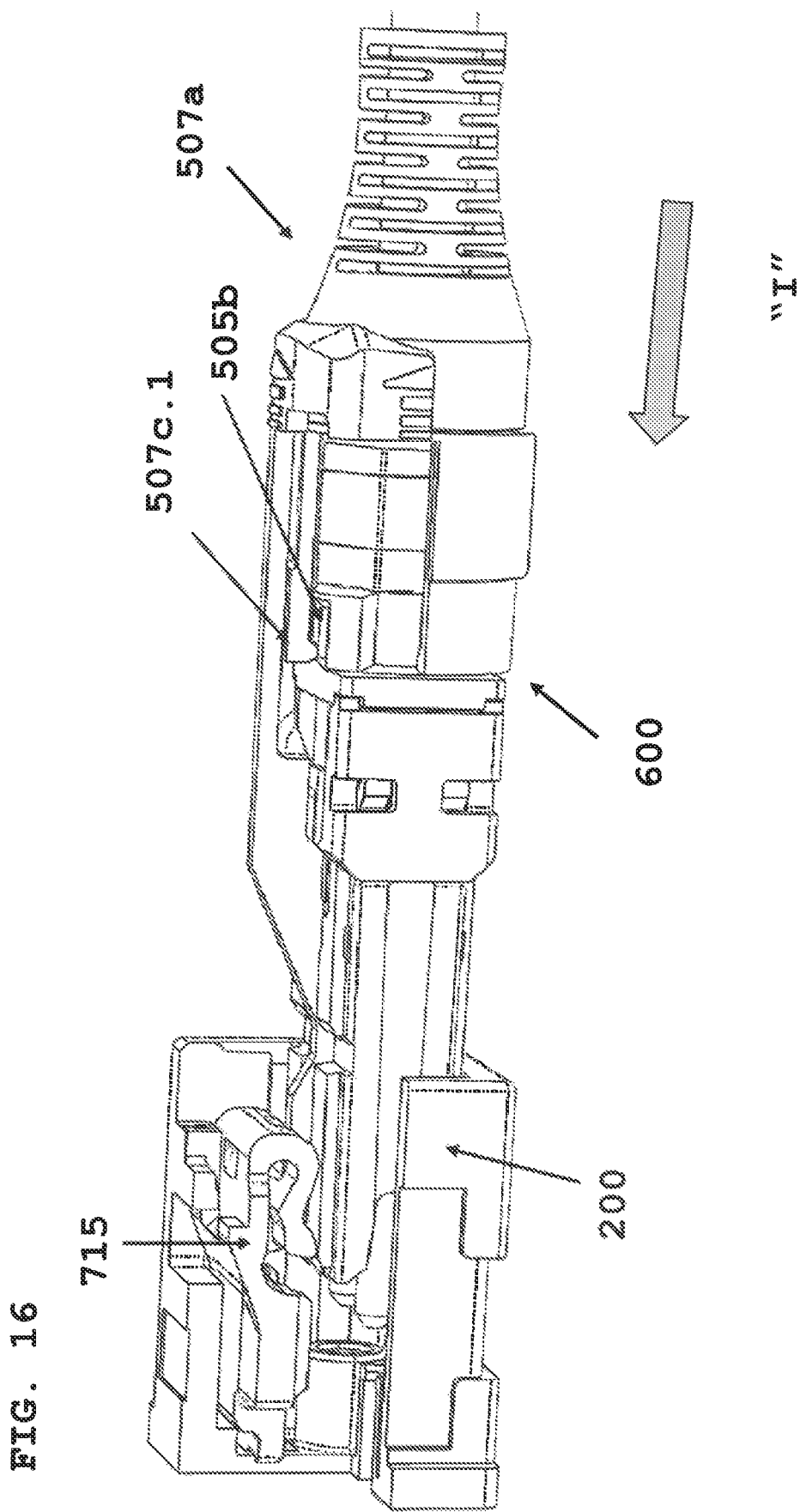
FIG. 16 depicts insertion of connector of FIG. 9 into a receptacle.
Figure 17:
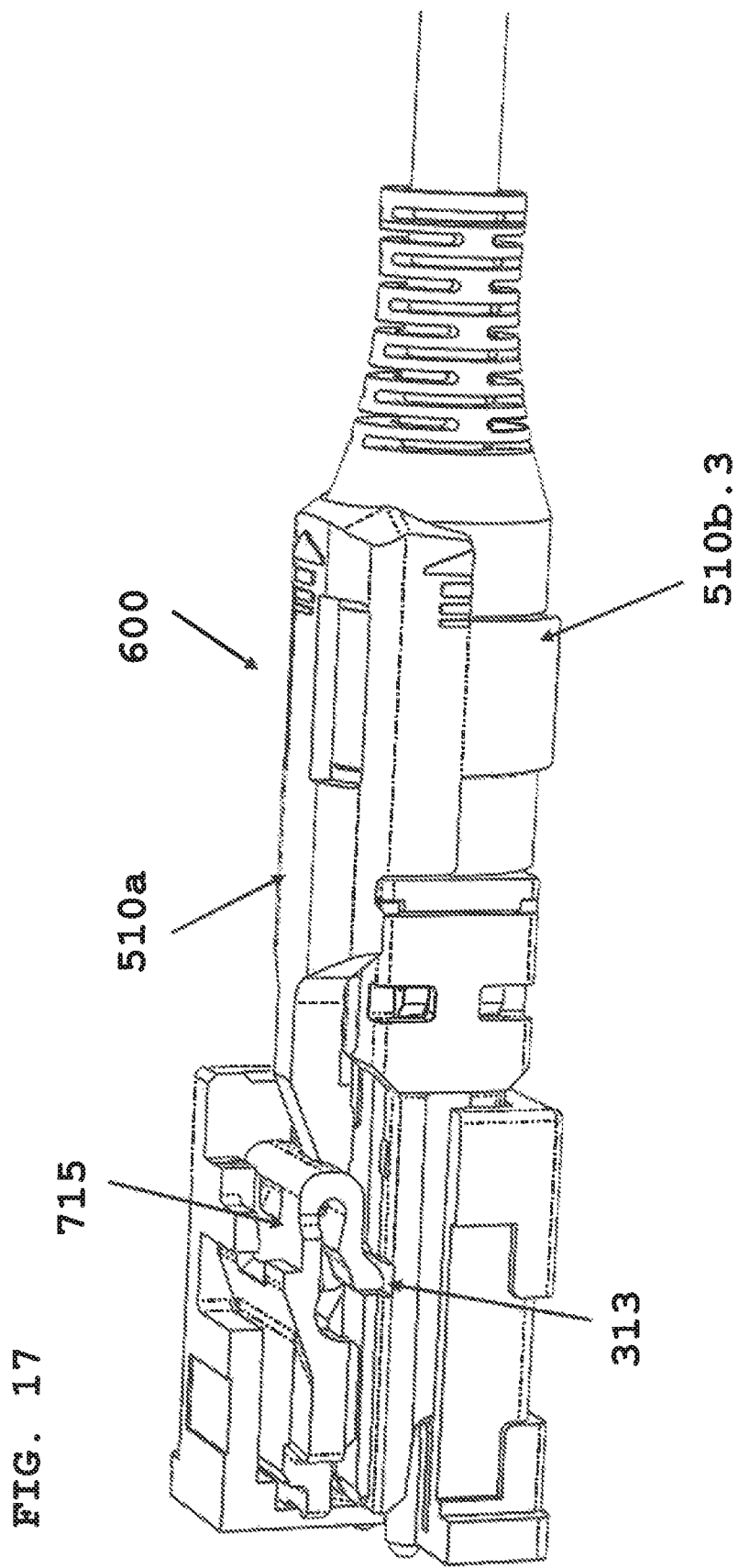
FIG. 17 depicts connector of FIG. 9 inserted into a receptacle.

FIG. 15 depicts back body 505a cut out 505b, with back body secured within crimp ring 506a. FIG. 15A is a cross-section cut-out of FIG. 15 (shown by dotted line), with cable boot protrusion 507c.1 (although more than one protrusion/back body cut out can be used), moveable within back body cut out 505b. Upon pulling cable or cable boot rearward, protrusion 507c.1 moves rearward along cut out. The distance moved allows push/pull clip ramp surface 604 to lift anchor device leg 716 from widthwise recess 603, which releases connector 500 from a receptacle port. FIG. 16 depicts connector 600 being inserted into receptacle 200 port in direction of arrow "I". Anchor device 715 is out of recess. The cable boot protrusions 507c.1 is fully forward in back body recess/cut-out 505b. FIG. 17 depicts connector 600 fully inserted into receptacle port, with anchor leg 715 within width-wise recess 313. Wing 5120b.3 permanently may secures push/pull clip 510a to cable boot 507a.

Figure 18:
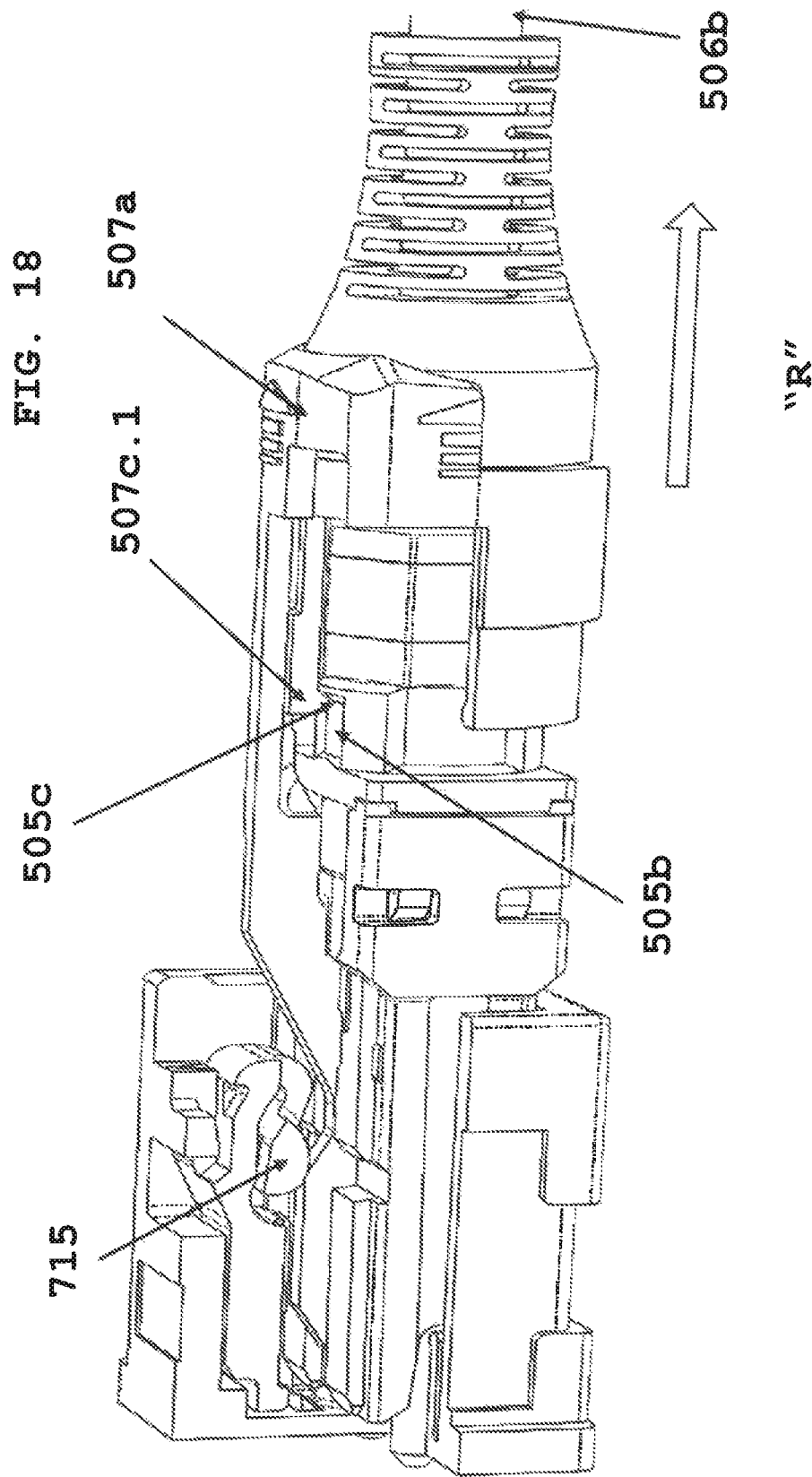
FIG. 18 depicts removal of connector of FIG. 9 from a receptacle.
Figure 19:
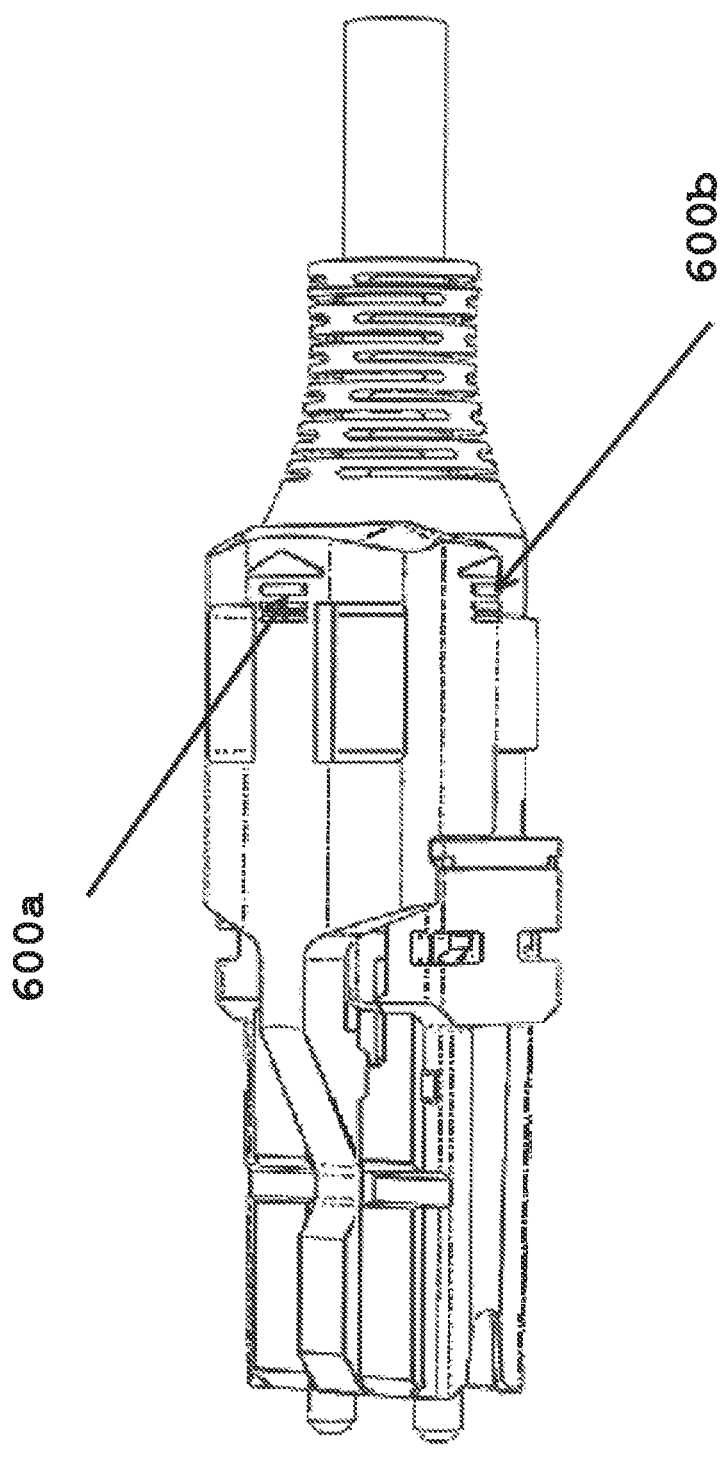
FIG. 19 depicts a raised surface to use to pull connector of FIG. 9 rearward.

FIG. 18 depicts connector (500, 600) being removed from receptacle port by a user pulling on cable boot 507a or cable 506c in direction of arrow "R". Protrusion 507c.1 moves rearward within back body cut-out/recess 505b, until protrusions is stopped by a recess stop face 505c. The length of recess 505b is sized to accommodate a protrusion 507c.1, and to allow ramp surface 604 to lift out anchor leg 517 from recess 503, and release connector (500, 600) from the receptacle port. FIG. 19 connector with a raised surface 600a or 600b to pull on to release connector.

Figure 20:
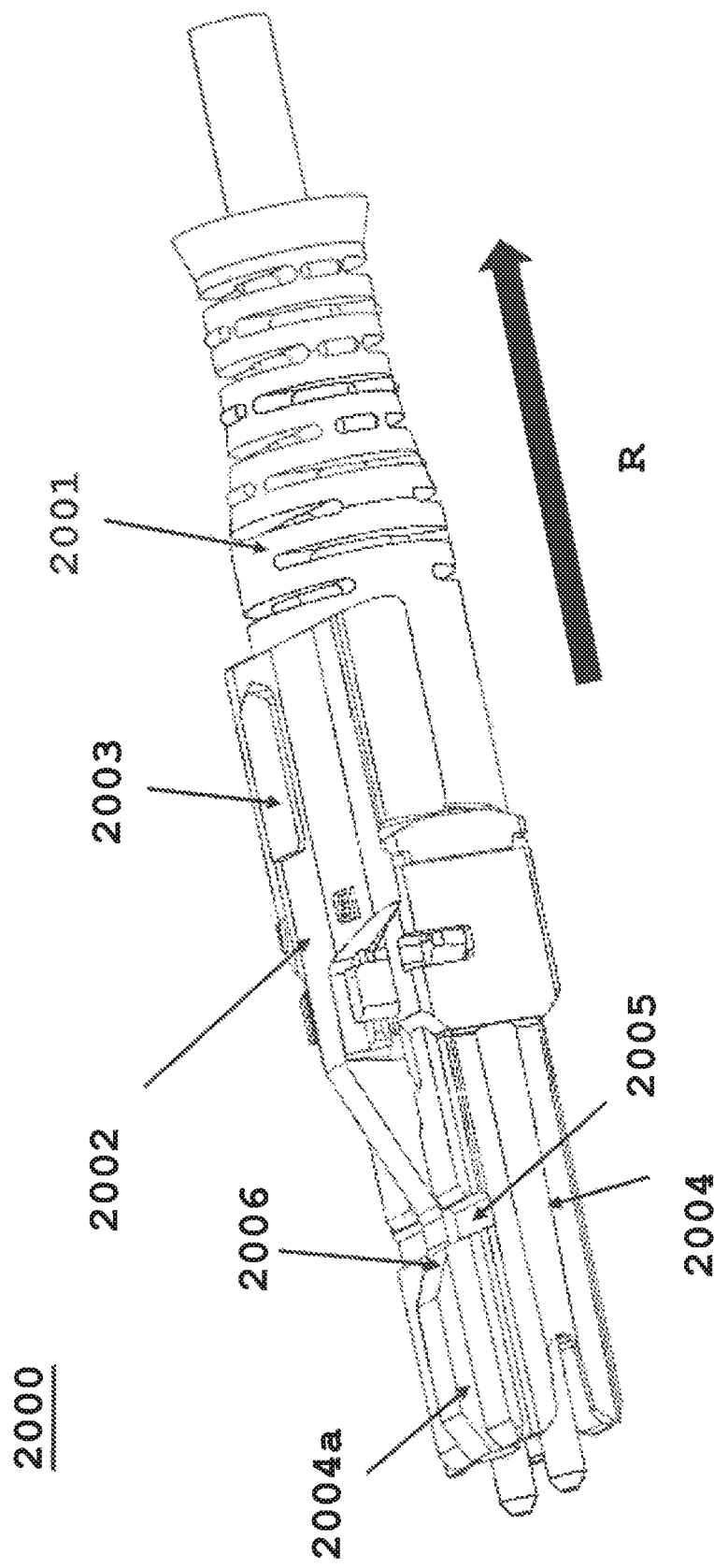
FIG. 20 depicts another fiber optic connector configured to be released from an adapter using a cable boot.

FIG. 20 depicts an assembled view of a fiber optic connector 2000 with cable boot 2001 configured to move the adapter release 2002, in a distal direction or direction of arrow "R", of connector 2000 from an adapter port (as described above in FIGS. 16-18). Connector housing has channel 2004a that accepts adapter release 2002. Connector 2000 has connector housing 2004 that accepts backbody 2007 (FIG. 22). Backbody 2007 is configured to retain adapter release 2002 (refer to FIG. 21). Adapter release 2002 has ramp 2006 that lifts hook or latch retained within recess 2005 when connector 2000 is inserted in an adapter port as shown above. In operation, cable boot 2001 has a protrusion 2003 that is retained within opening 2002a (FIG. 22) of adapter release 2002. Since backbody 2007 is attached to adapter release 2002 and connector housing 2004 and cable boot is secured to adapter release 2002, when pulling on the cable boot in direction "R", adapter release 2002 ramp 2006 causes the adapter hook to lift out of recess 2005 thereby releasing the connector 2000 from an adapter port.

Figure 21:
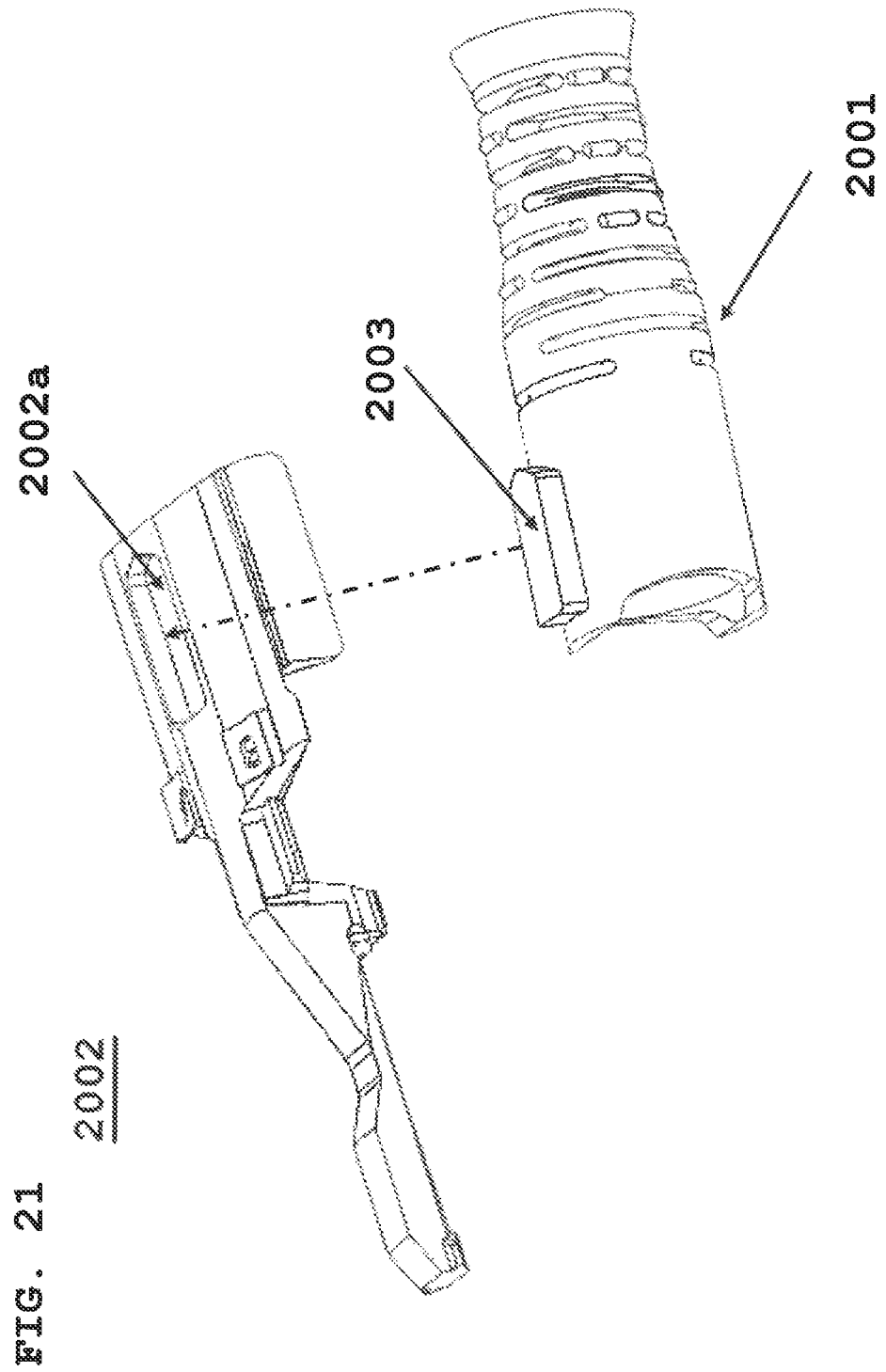
FIG. 21 depicts an exploded view of ramp release housing configured to accept the cable boot.
Figure 22:
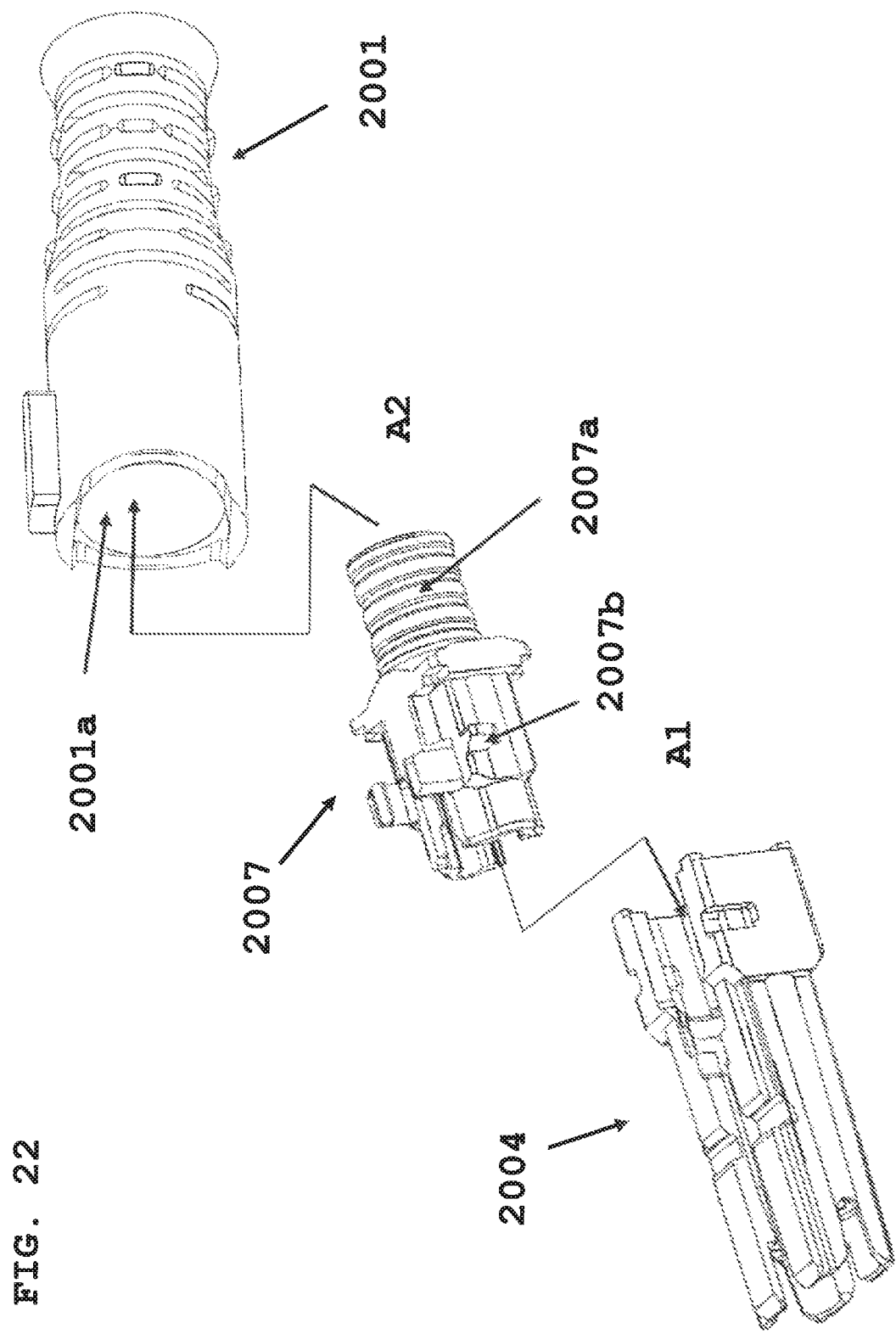
FIG. 22 depicts an exploded view showing assembly of fiber optic connector housing and backbody with the cable boot.

FIG. 21 depicts adapter release 2002 with opening 2002a configured to accept protrusion 2003 formed as part of cable boot 2001. When assembled, protrusion 2003 is retained within opening 2002a as shown by dotted arrow. FIG. 22 depicts assembling connector housing 2004 to backbody 2007 at step A1 via latches 2007b, and inserting ribbed flange 2007a of backbody 2007 into bore or opening 2001a of cable boot, thereby securing the cable boot to the connector body.

In the above detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be used, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled.

It will be understood by those within the art that, in general, terms used herein, and especially in the appended claims (for example, bodies of the appended claims) are generally intended as "open" terms (for example, the term "including" should be interpreted as "including but not limited to," the term "having" should be interpreted as "having at least," the term "includes" should be interpreted as "includes but is not limited to," et cetera). While various compositions, methods, and devices are described in terms of "comprising" various components or steps (interpreted as meaning "including, but not limited to"), the compositions, methods, and devices can also "consist essentially of" or "consist of" the various components and steps, and such terminology should be interpreted as defining essentially closed-member groups. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (for example, "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (for example, the bare recitation of "two recitations," without other modifiers, means at least two recitations, or two or more recitations). Furthermore, in those instances where a convention analogous to "at least one of A, B, anti C, et cetera" is used, in general such a construction is intended in the sense one having skill in the art would understand the convention (for example, "a system having at least one of A, B, and C" would include but not be limited to systems that have A alone, B alone, C alone, A and B together, A and C together, B and C together, and/or A, B, and C together, et cetera). In those instances where a convention analogous to "at least one of A, B, or C, et cetera" is used, in general such a construction is intended in the sense one having skill in the art would understand the convention (for example, "a system having at least one of A, B, or C" would include but not be limited to systems that have A alone, B alone, C alone, A and B together, A and C together, B and C together, and/or A, B, and C together, et cetera). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

Various of the above-disclosed and other features and functions, or alternatives thereof, may be combined into many other different systems or applications. Various presently unforeseen or unanticipated alternatives, modifications, variations, or improvements therein may be subsequently made by those skilled in the art, each of which is also intended to be encompassed by the disclosed embodiments.

What is claimed is:

1. A push-pull boot connector, comprising:
   a boot member having a protrusion and a first end with a bore;
   a backbody having a ribbed flange, the bore of the boot member being sized and shaped to accept ribbed of the backbody,
   the backbody at a second end having a plurality of latches that secure the backbody to a connector housing,
   an adapter release;
   a connector housing has a channel at a first end and accepts the adapter release in the channel;
   the adapter release having an opening that accepts the protrusion of the boot member; and wherein
   actuating the boot member in a distal direction, the adapter release moves a latch hook out of a connector recess, thereby, releasing the connector from an adapter port.

2. The push-pull boot connector as set forth in claim 1, wherein the opening comprises a slot that is elongate along the longitudinal axis.

3. The push-pull boot connector as set forth in claim 2, wherein the protrusion has an elongate shape that is elongate along the longitudinal axis.

4. The push-pull boot connector as set forth in claim 1, wherein the protrusion has a proximal end portion and a distal end portion spaced apart along the longitudinal axis.

5. The push-pull boot connector as set forth in claim 4, wherein the opening comprises a proximal end and a distal end and the adapter release comprises a first portion defining the proximal end of the opening and a second portion defining the distal end of the opening.

6. The push-pull boot connector as set forth in claim 5, wherein when the opening receives the protrusion, the first portion of the adapter release is configured to oppose the proximal end portion of the protrusion and the second portion of the adapter release is configured to oppose the distal end portion of the protrusion.

7. The push-pull boot connector as set forth in claim 6, wherein the distal end portion of the protrusion is configured to bear against the second portion of the adapter release when the boot member is actuated in the distal direction to move the adapter release in the distal direction relative to the connector housing.

8. The push-pull boot connector as set forth in claim 1, wherein the connector housing comprises a duplex connector housing configured to plugged into the adapter port.

9. The push-pull boot connector as set forth in claim 8, further comprising first and second optical fiber ferrules received in the connector housing.

10. The push-pull boot connector as set forth in claim 1, wherein the backbody and the adapter release comprise mutual latching features configured to retain the adapter release on the connector housing.

11. The push-pull boot connector as set forth in claim 1, wherein the backbody comprises a back post and a portion of the boot member is configured to be disposed on the back post.

* * * * *